US012563456B2

(12) United States Patent
Wu

(10) Patent No.: US 12,563,456 B2
(45) Date of Patent: Feb. 24, 2026

(54) MANAGING SIDELINK COMMUNICATION

(71) Applicant: GOOGLE LLC, Mountain View, CA (US)

(72) Inventor: Chih-Hsiang Wu, Taoyuan (TW)

(73) Assignee: GOOGLE LLC, Mountain View, CA (US)

( * ) Notice: Subject to any disclaimer, the term of this patent is extended or adjusted under 35 U.S.C. 154(b) by 351 days.

(21) Appl. No.: 18/020,026

(22) PCT Filed: Aug. 6, 2021

(86) PCT No.: PCT/US2021/044972
§ 371 (c)(1),
(2) Date: Feb. 6, 2023

(87) PCT Pub. No.: WO2022/032114
PCT Pub. Date: Feb. 10, 2022

(65) Prior Publication Data
US 2023/0276313 A1      Aug. 31, 2023

Related U.S. Application Data

(60) Provisional application No. 63/062,425, filed on Aug. 6, 2020.

(51) Int. Cl.
*H04W 36/00* (2009.01)
*H04W 76/27* (2018.01)
*H04W 92/18* (2009.01)

(52) U.S. Cl.
CPC ........ *H04W 36/0069* (2018.08); *H04W 76/27* (2018.02); *H04W 92/18* (2013.01)

(58) Field of Classification Search
CPC .. H04W 36/0069; H04W 76/27; H04W 92/18
See application file for complete search history.

(56) References Cited

U.S. PATENT DOCUMENTS

2017/0215119 A1      7/2017   Hong et al.
2019/0281518 A1*     9/2019   Wu ................... H04W 36/0066
(Continued)

FOREIGN PATENT DOCUMENTS

CN          111 148 224 A      5/2020
WO      WO-2020/088519 A1      5/2020

OTHER PUBLICATIONS

5G V2X with NR sidelink France, Jun. 22, 2020 (Year: 2020).*
(Continued)

*Primary Examiner* — Mewale A Ambaye
(74) *Attorney, Agent, or Firm* — MARSHALL, GERSTEIN & BORUN LLP

(57) ABSTRACT

A method of obtaining sidelink configuration in a CU of a distributed base station includes receiving sidelink information related to sidelink communications at a UE operating in a first cell (1602); initiating handover procedure or a cell change procedure so that the UE utilizes a radio resource on a second cell associated with a target node, the target node corresponding to a DU of the distributed base station or another base station (1604); transmitting, to the target node, a request to set up a context for the UE, the request including the sidelink information (1606); and receiving, from the target node, a response to the request, the response including a sidelink configuration for the UE (1608).

14 Claims, 19 Drawing Sheets

(56)  References Cited

U.S. PATENT DOCUMENTS

| 2019/0387444 | A1 * | 12/2019 | Byun | .................... | H04W 36/06 |
| 2023/0337321 | A1 * | 10/2023 | Tseng | ................ | H04W 52/0219 |
| 2023/0370987 | A1 * | 11/2023 | Park | ..................... | H04W 16/14 |
| 2024/0064592 | A1 * | 2/2024 | Falkenberg | ........... | H04W 24/08 |

OTHER PUBLICATIONS

NPL Document, "Technical specification group radio access network" France, Jul. 17, 2020 (Year: 2020).*

"3rd Generation Partnership Project; Technical Specification Group Radio Access Network; NG-RAN; Architecture Description (Release 16)," 3GPP Standard (2020).

International Search Report and Written Opinion for Application No. PCT/US2021/044972, dated Nov. 24, 2021.

LG Electronics, "5G V2X with NR Sidelink," 3GPP Draft (2020).

ZTE Corporation et al., "Discussion on the LS on Sidelink UE Information Sent from RAN3," 3GPP Draft (2020).

Ericsson, "Mobility procedures," 3GPP TSG-RAN WG3 #98 (2017).

Office Action for Japanese Application No. 2023-508040, dated Mar. 25, 2024.

* cited by examiner

104 / 106A / 106B

200

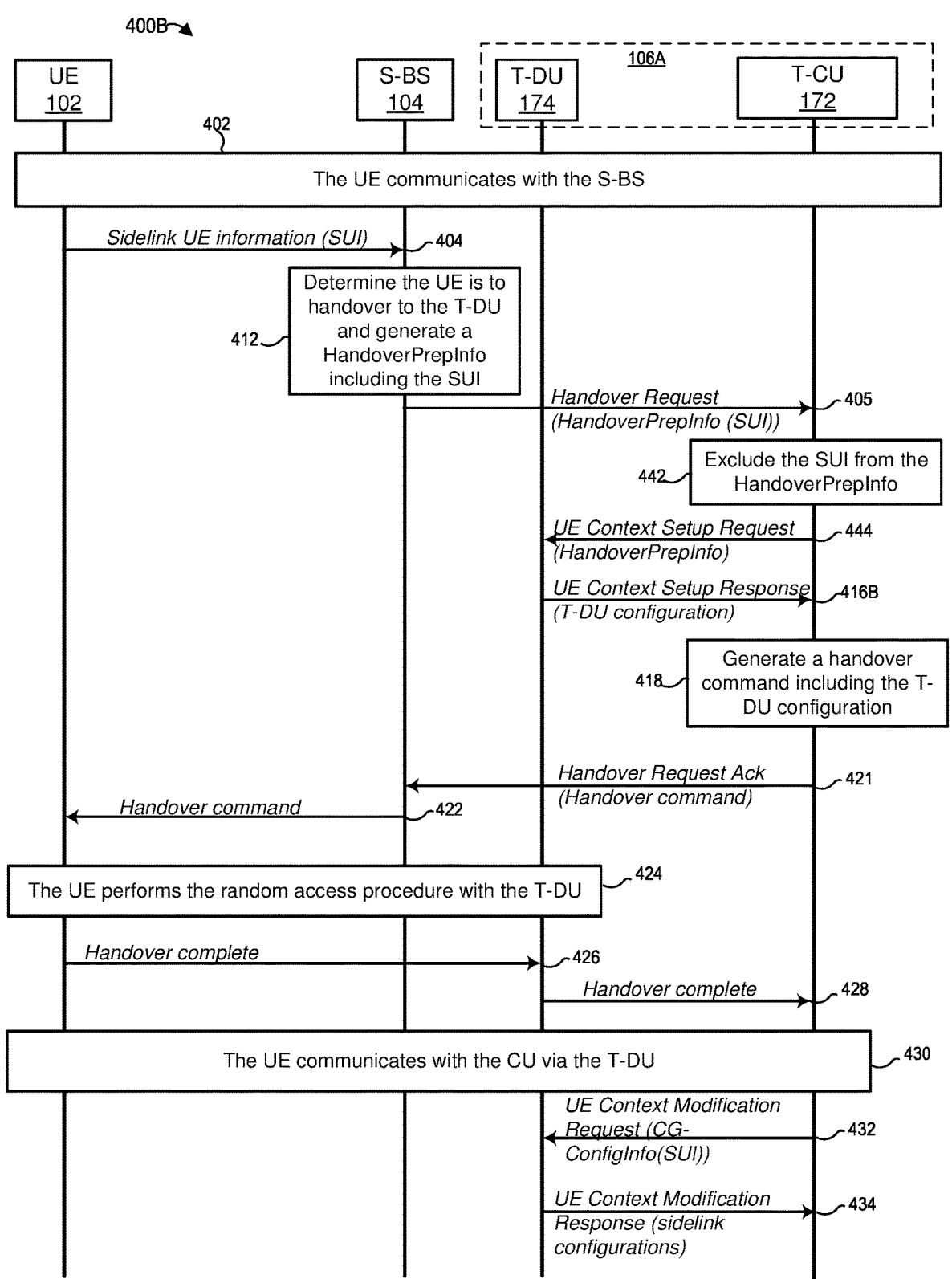

400B

| UE 102 | S-BS 104 | T-DU 174 | 106A | T-CU 172 |

402

The UE communicates with the S-BS

*Sidelink UE information (SUI)* —404

412 — Determine the UE is to handover to the T-DU and generate a HandoverPrepInfo including the SUI

*Handover Request (HandoverPrepInfo (SUI))* —405

442 — Exclude the SUI from the HandoverPrepInfo

*UE Context Setup Request (HandoverPrepInfo)* —444

*UE Context Setup Response (T-DU configuration)* —416B

418 — Generate a handover command including the T-DU configuration

*Handover Request Ack (Handover command)* —421

*Handover command* —422

The UE performs the random access procedure with the T-DU —424

*Handover complete* —426

*Handover complete* —428

The UE communicates with the CU via the T-DU —430

*UE Context Modification Request (CG-ConfigInfo(SUI))* —432

*UE Context Modification Response (sidelink configurations)* —434

Figure 4B

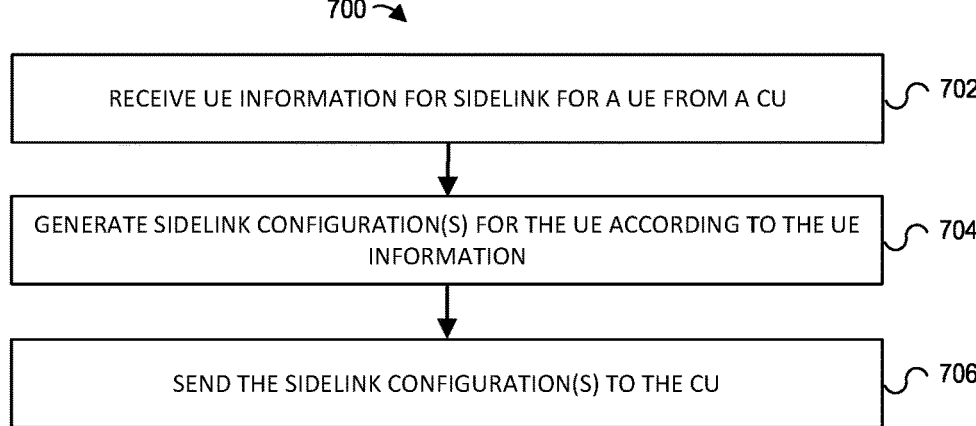

700 ⟶

| RECEIVE UE INFORMATION FOR SIDELINK FOR A UE FROM A CU | ⟲ 702 |

↓

| GENERATE SIDELINK CONFIGURATION(S) FOR THE UE ACCORDING TO THE UE INFORMATION | ⟲ 704 |

↓

| SEND THE SIDELINK CONFIGURATION(S) TO THE CU | ⟲ 706 |

| RECEIVE SIDELINK UE INFORMATION FOR A UE | ⟲ 802 |

↓

804

RECEIVE THE SIDELINK UE INFORMATION ON A SRB OR IN A CONTAINER IE?

CONTAINER IE →

↓ SRB

806

GENERATE AN FIRST INTERFACE MESSAGE WHICH INCLUDES A CG-CONFIGINFO IE INCLUDING THE SIDELINK UE INFORMATION

↓

808 — SEND THE FIRST INTERFACE MESSAGE TO A FIRST DU

810 — REFRAIN FROM GENERATING A CG-CONFIGINFO INCLUDING THE SIDELINK UE INFORMATION

↓

812 — GENERATE A SECOND INTERFACE MESSAGE WHICH INCLUDES THE CONTAINER IE

↓

814 — SEND THE SECOND INTERFACE MESSAGE TO A SECOND DU

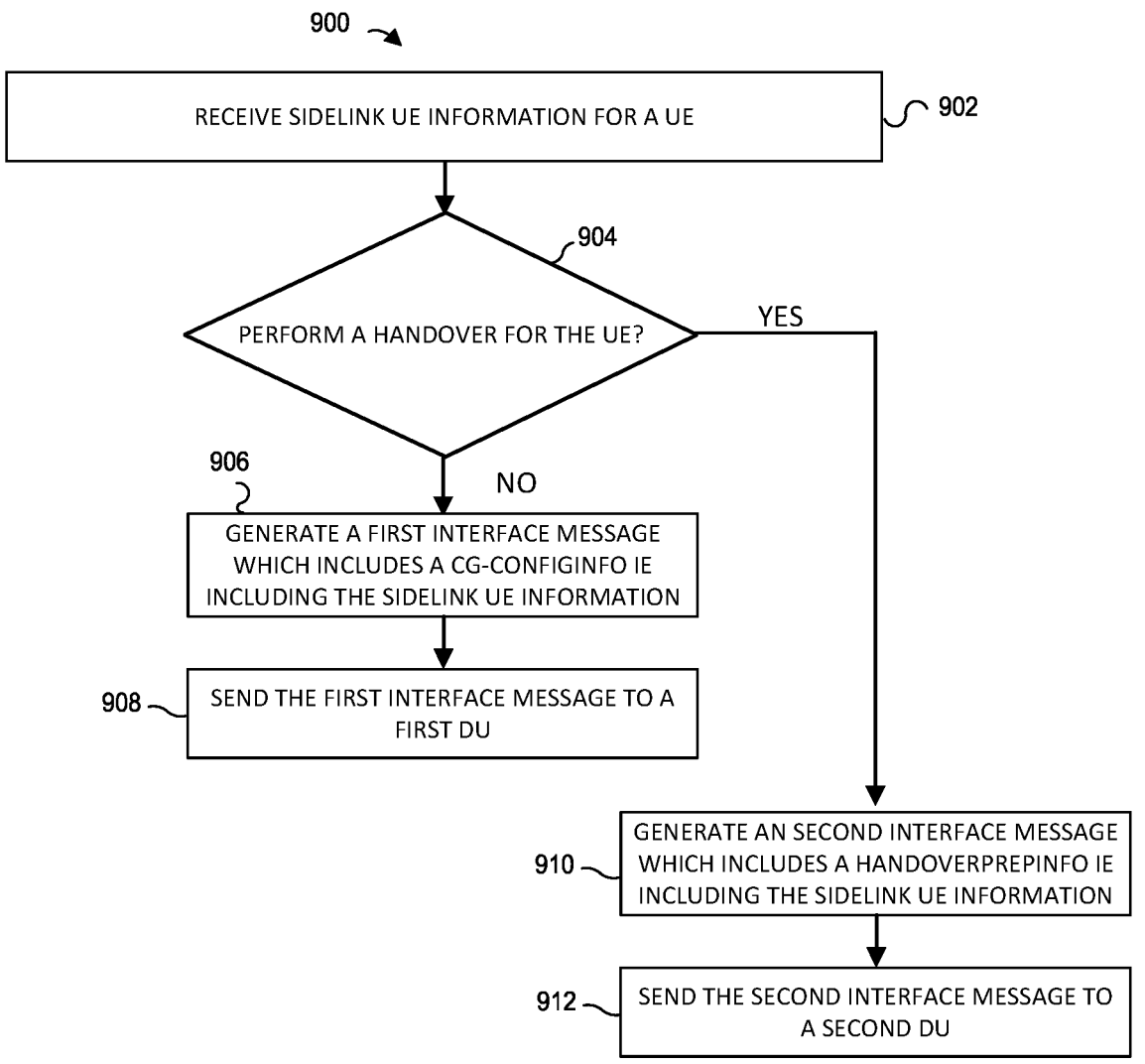

RECEIVE SIDELINK UE INFORMATION FOR A UE — 902

904

PERFORM A HANDOVER FOR THE UE?        YES

NO

906

GENERATE A FIRST INTERFACE MESSAGE WHICH INCLUDES A CG-CONFIGINFO IE INCLUDING THE SIDELINK UE INFORMATION

908 — SEND THE FIRST INTERFACE MESSAGE TO A FIRST DU

910 — GENERATE AN SECOND INTERFACE MESSAGE WHICH INCLUDES A HANDOVERPREPINFO IE INCLUDING THE SIDELINK UE INFORMATION

912 — SEND THE SECOND INTERFACE MESSAGE TO A SECOND DU

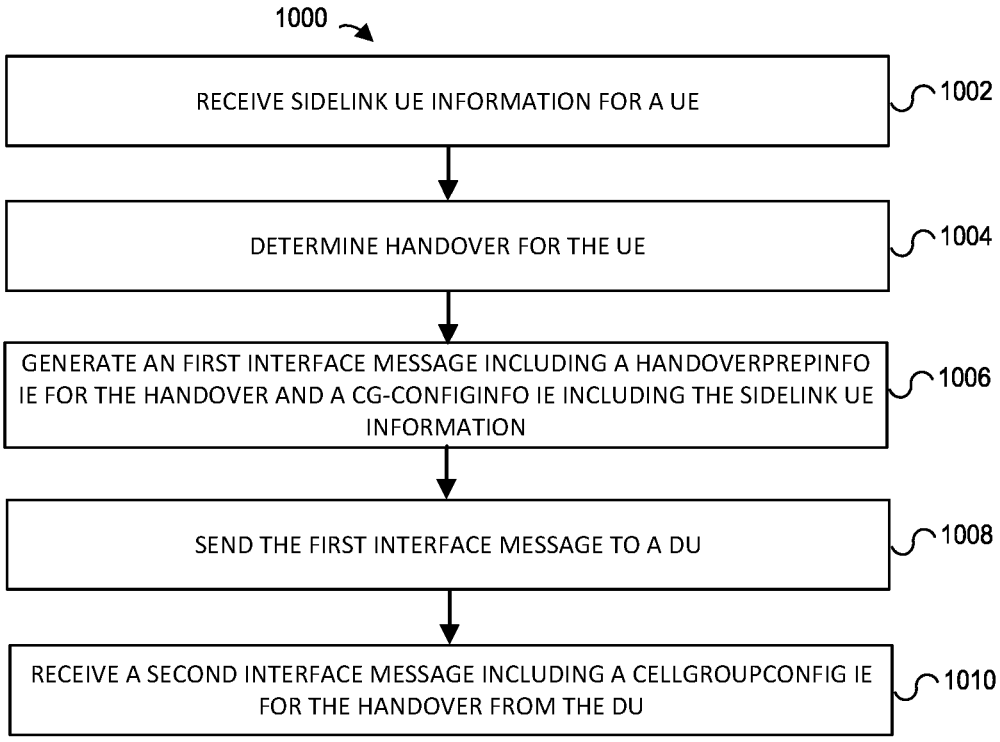

| | |
|---|---|
| RECEIVE SIDELINK UE INFORMATION FOR A UE | 1002 |
| DETERMINE HANDOVER FOR THE UE | 1004 |
| GENERATE AN FIRST INTERFACE MESSAGE INCLUDING A HANDOVERPREPINFO IE FOR THE HANDOVER AND A CG-CONFIGINFO IE INCLUDING THE SIDELINK UE INFORMATION | 1006 |
| SEND THE FIRST INTERFACE MESSAGE TO A DU | 1008 |
| RECEIVE A SECOND INTERFACE MESSAGE INCLUDING A CELLGROUPCONFIG IE FOR THE HANDOVER FROM THE DU | 1010 |

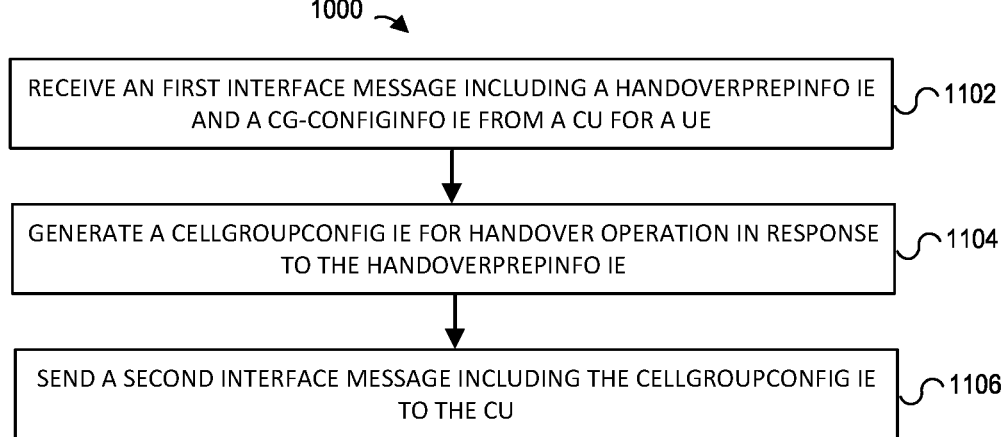

| | |
|---|---|
| RECEIVE AN FIRST INTERFACE MESSAGE INCLUDING A HANDOVERPREPINFO IE AND A CG-CONFIGINFO IE FROM A CU FOR A UE | 1102 |
| GENERATE A CELLGROUPCONFIG IE FOR HANDOVER OPERATION IN RESPONSE TO THE HANDOVERPREPINFO IE | 1104 |
| SEND A SECOND INTERFACE MESSAGE INCLUDING THE CELLGROUPCONFIG IE TO THE CU | 1106 |

RECEIVE UE INFORMATION FOR SIDELINK FOR A UE          1302

1304

THE UE INFORMATION FOR SIDELINK CONFORMS TO A FIRST RAT OR A SECOND RAT?          SECOND RAT

1306

FIRST RAT

INCLUDE THE UE INFORMATION FOR SIDELINK IN A FIRST FIELD

1308          INCLUDE THE UE INFORMATION FOR SIDELINK IN A SECOND FIELD

1310

SEND AN INTERFACE MESSAGE INCLUDING THE FIRST FIELD OR THE SECOND FIELD TO A DU

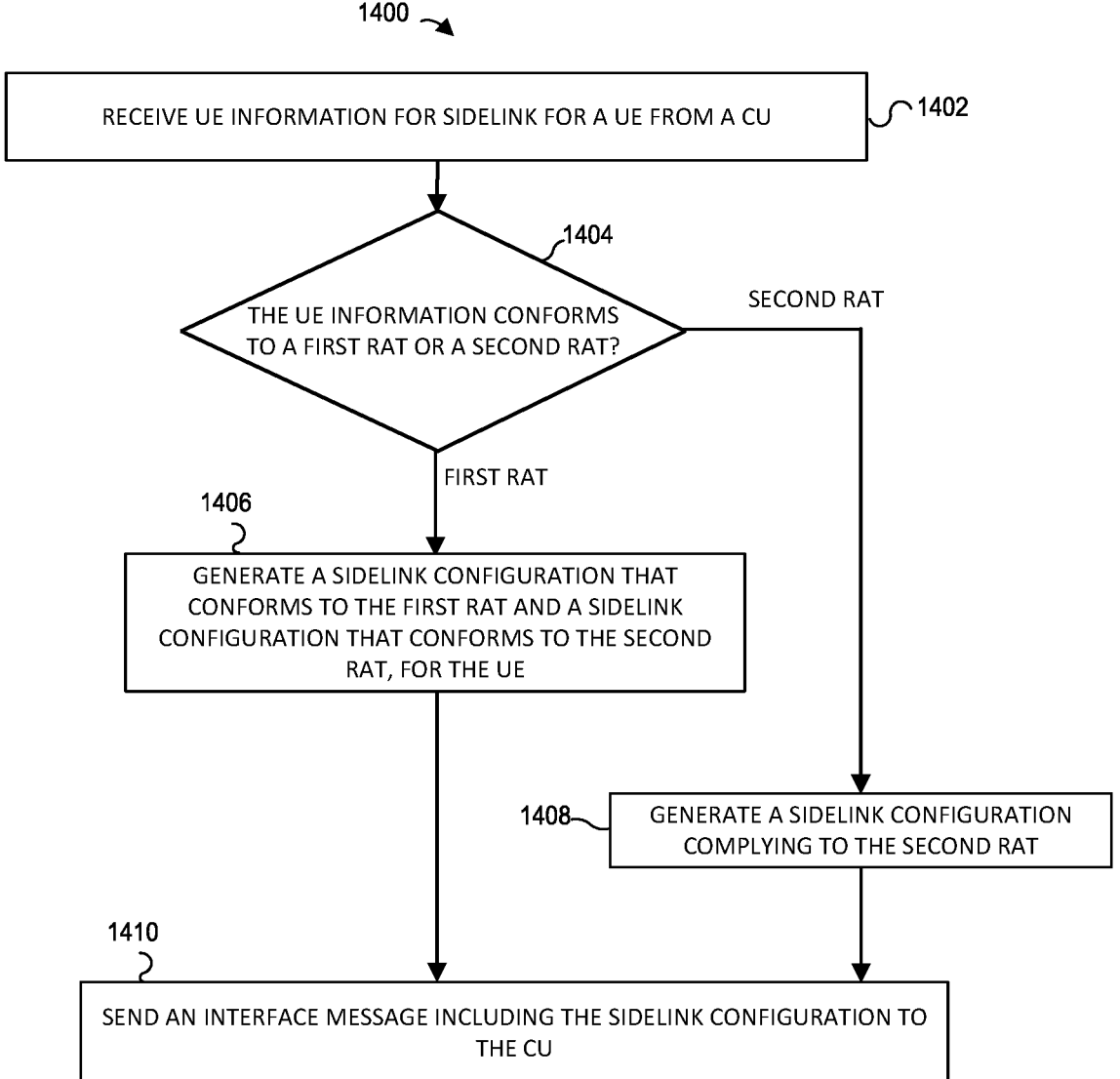

1400

RECEIVE UE INFORMATION FOR SIDELINK FOR A UE FROM A CU     1402

1404

THE UE INFORMATION CONFORMS TO A FIRST RAT OR A SECOND RAT?

SECOND RAT

FIRST RAT

1406

GENERATE A SIDELINK CONFIGURATION THAT CONFORMS TO THE FIRST RAT AND A SIDELINK CONFIGURATION THAT CONFORMS TO THE SECOND RAT, FOR THE UE

1408 — GENERATE A SIDELINK CONFIGURATION COMPLYING TO THE SECOND RAT

1410

SEND AN INTERFACE MESSAGE INCLUDING THE SIDELINK CONFIGURATION TO THE CU

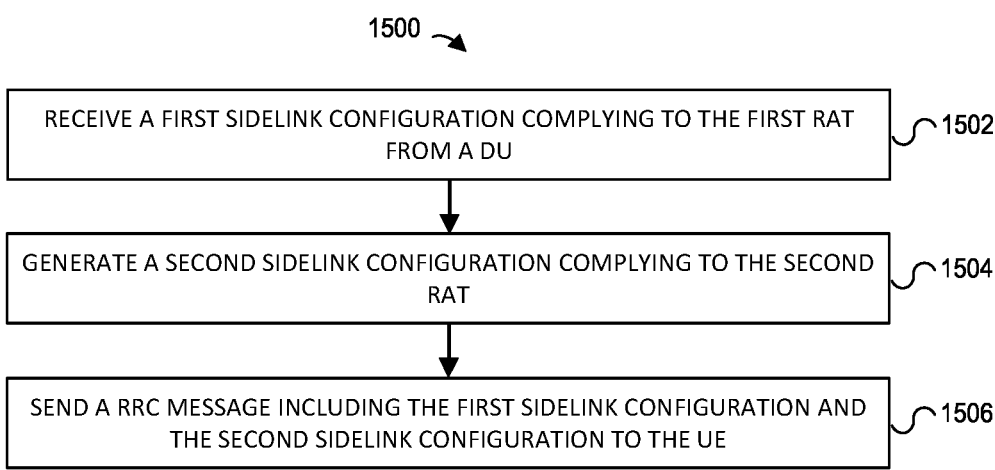

| | |
|---|---|
| RECEIVE A FIRST SIDELINK CONFIGURATION COMPLYING TO THE FIRST RAT FROM A DU | 1502 |
| GENERATE A SECOND SIDELINK CONFIGURATION COMPLYING TO THE SECOND RAT | 1504 |
| SEND A RRC MESSAGE INCLUDING THE FIRST SIDELINK CONFIGURATION AND THE SECOND SIDELINK CONFIGURATION TO THE UE | 1506 |

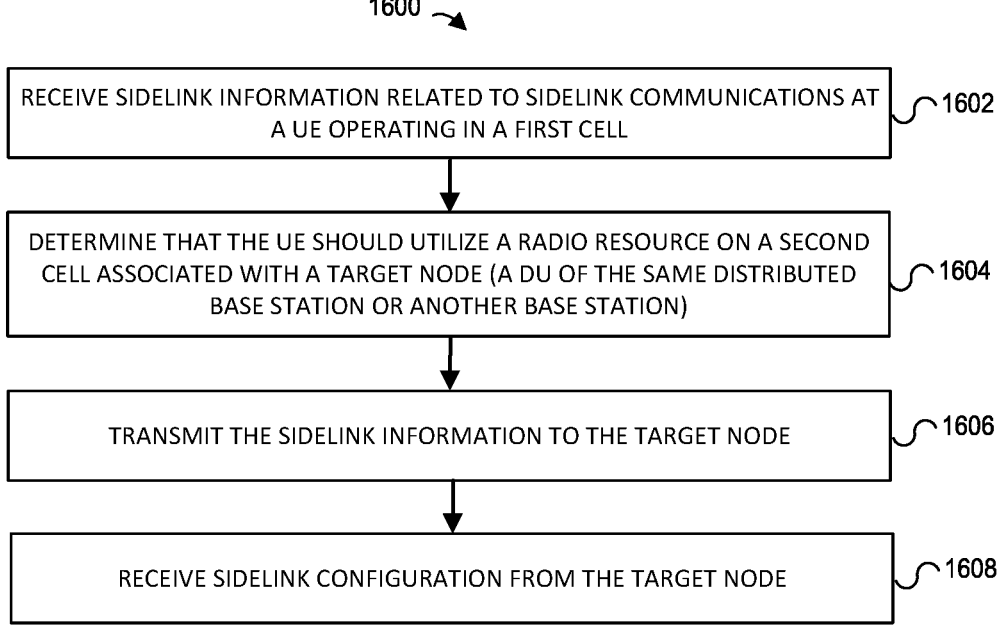

| | |
|---|---|
| RECEIVE SIDELINK INFORMATION RELATED TO SIDELINK COMMUNICATIONS AT A UE OPERATING IN A FIRST CELL | 1602 |
| DETERMINE THAT THE UE SHOULD UTILIZE A RADIO RESOURCE ON A SECOND CELL ASSOCIATED WITH A TARGET NODE (A DU OF THE SAME DISTRIBUTED BASE STATION OR ANOTHER BASE STATION) | 1604 |
| TRANSMIT THE SIDELINK INFORMATION TO THE TARGET NODE | 1606 |
| RECEIVE SIDELINK CONFIGURATION FROM THE TARGET NODE | 1608 |

Figure 16

MANAGING SIDELINK COMMUNICATION

FIELD OF THE DISCLOSURE

This disclosure relates generally to wireless communications and, more particularly, to sidelink communication operations.

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In telecommunication systems, the Packet Data Convergence Protocol (PDCP) sublayer of the radio protocol stack provides services such as transfer of user-plane data, ciphering, integrity protection, etc. For example, the PDCP layer defined for the Evolved Universal Terrestrial Radio Access (EUTRA) radio interface (see 3GPP specification TS 36.323) and New Radio (NR) (see 3GPP specification TS 38.323) provides sequencing of protocol data units (PDUs) in the uplink direction (from a user device, also known as a user equipment (UE), to a base station) as well as in the downlink direction (from the base station to the UE). Further, the PDCP sublayer provides services for signaling radio bearers (SRBs) to the Radio Resource Control (RRC) sublayer. The PDCP sublayer also provides services for data radio bearers (DRBs) to a Service Data Adaptation Protocol (SDAP) sublayer or a protocol layer such as an Internet Protocol (IP) layer, an Ethernet protocol layer, and an Internet Control Message Protocol (ICMP) layer. Generally speaking, the UE and a base station can use SRBs to exchange RRC messages as well as non-access stratum (NAS) messages, and can use DRBs to transport data on a user plane.

UEs can use several types of SRBs and DRBs. When operating in dual connectivity (DC), the cells associated with the base station operating as the master node (MN) define a master cell group (MCG), and the cells associated with the base station operating as the secondary node (SN) define the secondary cell group (SCG). So-called SRB1 resources carry RRC messages, which in some cases include NAS messages over the dedicated control channel (DCCH), and SRB2 resources support RRC messages that include logged measurement information or NAS messages, also over the DCCH but with lower priority than SRB1 resources. More generally, SRB1 and SRB2 resources allow the UE and the MN to exchange RRC messages related to the MN and embed RRC messages related to the SN, and also can be referred to as MCG SRBs. SRB3 resources allow the UE and the SN to exchange RRC messages related to the SN, and can be referred to as SCG SRBs. Split SRBs allow the UE to exchange RRC messages directly with the MN via lower layer resources of the MN and the SN. Further, DRBs terminated at the MN and using the lower-layer resources of only the MN can be referred as MCG DRBs, DRBs terminated at the SN and using the lower-layer resources of only the SN can be referred as SCG DRBs, and DRBs terminated at the MCG but using the lower-layer resources of the MN, the SN, or both the MN and the SN can be referred to as split DRBs.

The UE in some scenarios can concurrently utilize resources of multiple nodes (e.g., base stations or components of a distributed base station) of a radio access network (RAN), interconnected by a backhaul. When these network nodes support different radio access technologies (RATs), this type of connectivity is referred to as Multi-Radio Dual Connectivity (MR-DC). When a UE operates in MR-DC, one base station operates as the MN that covers a primary cell (PCell), and the other base station operates as the SN that covers a primary secondary cell (PSCell). The UE communicates with the MN (via the PCell) and the SN (via the PSCell). In other scenarios, the UE utilizes resources of one base station at a time. One base station and/or the UE determines that the UE should establish a radio connection with another base station. For example, one base station can determine to hand the UE over to the second base station, and initiate a handover procedure. The UE in other scenarios can concurrently utilize resources of a RAN node (e.g., a single base station or a component of a distributed base station), interconnected by a backhaul.

In some cases, a UE can communicate with another UE using a so-called sidelink, or a radio link that directly interconnects a pair of UEs without a base station. Sidelink communications can conform for example to vehicle-to-everything (V2X) sidelink communication protocols specified in 3GPP specification TS 38.300 v16.2.0 (2020 July) section 16.9. Although the UEs exchange sidelink data directly, a base station can allocate, or facilitate allocation of, radio resources for sidelink communication in a licensed spectrum, unlicensed spectrum (e.g., within WLAN frequencies which the base station announces via a system information broadcast). Moreover, the licensed spectrum can include Citizens Broadband Radio Service (CBRS) frequencies in some geographic regions or licensed shared access (LSA) frequencies in other geographic regions.

Currently, it is not clear how a distributed base station can support certain operations related to sidelink configuration. For example, when a central unit (CU) determines that a UE should handover to another cell associated with a new distributed unit (DU) or a new base station, and when the UE has previously provided information for sidelink communications (e.g., one or more frequencies the UE prefers), the CU cannot always properly support these two procedures. More generally, a CU cannot always properly support a handover, a cell change, or DC operations concurrently with sidelink configurations.

Further, it is not clear how CU should support sidelink configurations where different cells involved in DC, handover, cell change, etc. support different radio access technologies (RATs).

SUMMARY

A distributed base station of this disclosure receives, at a CU from a DU, UE information relevant to sidelink communications, and determines that the UE should utilize radio resources of another DU or base station, or a "target node" more generally. The CU can base this determination on a concurrent handover procedure or a cell change procedure, for example, or on the frequency which the UE prefers for sidelink communications. The CU provides the UE information to the target node along with the information related to the procedure: for example, the CU provides information relevant to handover along with the UE information for sidelink communications in a manner than allows the UE to generate a configuration in view of both factors.

One example embodiment of these techniques is a method of obtaining sidelink configuration in a CU of a distributed base station. The method includes receiving sidelink information related to sidelink communications at a UE operating in a first cell; determining that the UE should utilize a radio resource on a second cell associated with a target node, the target node corresponding to a DU of the distributed base station or another base station; transmitting the sidelink information to the target node; and receiving, from the target node, a sidelink configuration for the UE.

Another example embodiment of these techniques is a method of generating sidelink configuration in a DU of a distributed base station. The method includes receiving, from a CU of the distributed base station, sidelink information related to sidelink communications at a UE operating in a first cell; generating the sidelink configuration for the UE based on the sidelink information; and transmitting the sidelink configuration to the CU.

BRIEF DESCRIPTION OF THE DRAWINGS

FIG. 4B is a messaging diagram of an example scenario generally similar to that of FIG. 3C, but with the handover occurring between different base stations rather than different DUs;

FIG. 4B is a messaging diagram of an example scenario generally similar to that of FIG. 3C, but with the handover occurring between different base stations rather than different DUs;

FIG. 7 is a flow diagram of an example method in a DU for generating sidelink configuration based on a UE information received from a CU;

FIG. 8 is a flow diagram of an example method in a CU for selecting a DU for configuring sidelink resources to a UE, with the selection based on whether UE sidelink information arrives from a UE or another base station;

FIG. 9 is a flow diagram of an example method in a CU for selecting a DU for configuring sidelink resources to a UE, with the selection based on whether the UE is performing a handover;

FIG. 10 is a flow diagram of an example method in a CU for configuring a DU to perform a handover of a UE concurrently with sidelink configuration of the UE;

FIG. 11 is a flow diagram of an example method in a DU for processing handover preparation information and a cell group configuration including sidelink information for a UE, both received from a CU;

FIG. 14 is a flow diagram of an example method in a DU for generating sidelink configuration in view of a RAT to which UE information for sidelink communications conforms;

FIG. 15 is a flow diagram of an example method in a CU for generating an RRC message with sidelink configuration in two different formats conforming to two respective RATs; and FIG. 16 is a flow diagram of an example method in a CU for managing sidelink communications.

DETAILED DESCRIPTION OF THE DRAWINGS

Figure 1A:
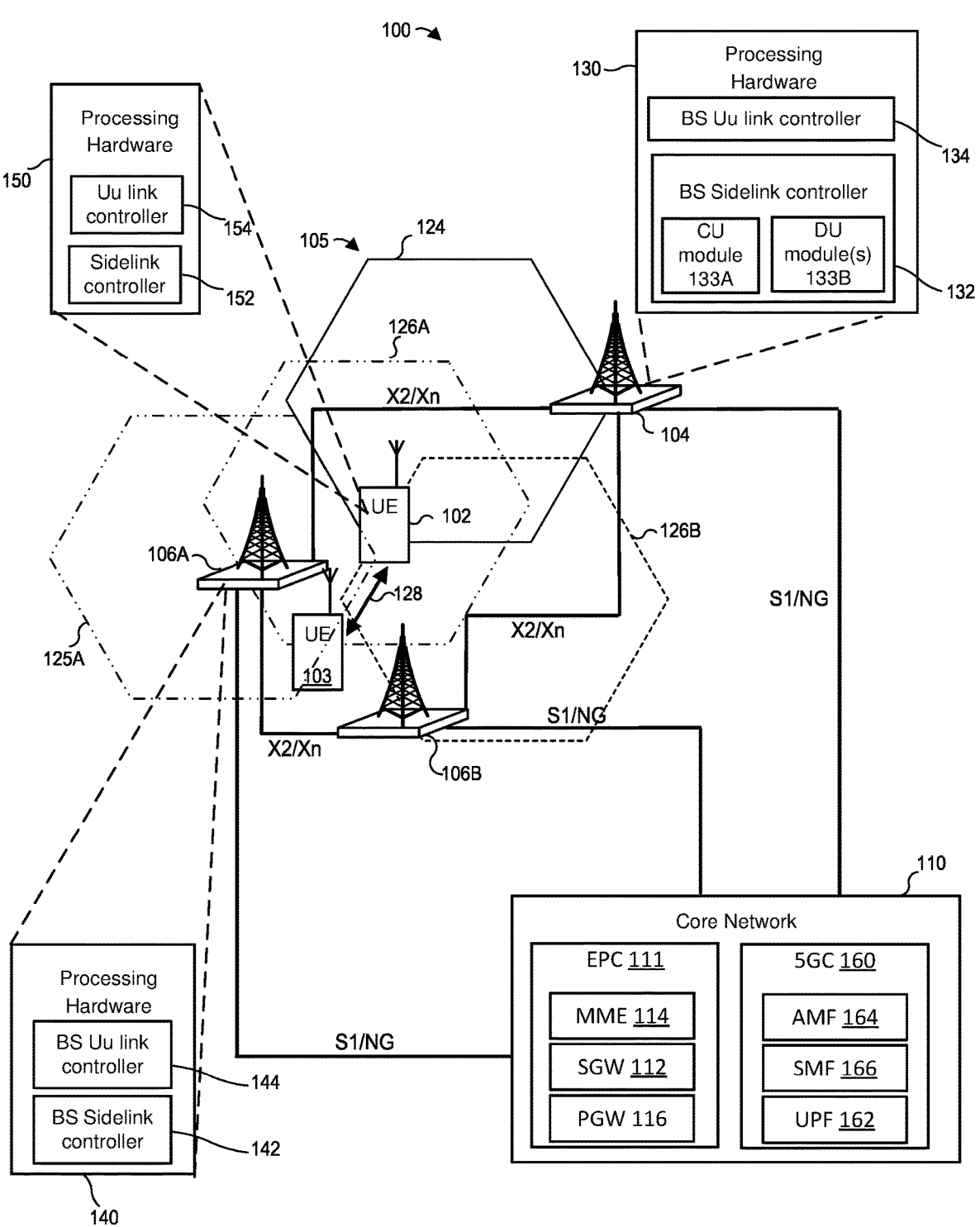
FIG. 1A is a block diagram of an example system in which a RAN can implement the techniques of this disclosure for configuring and managing sidelink communications.

FIG. 1A depicts an example wireless communication system 100 that can implement the sidelink configuration and management techniques of this disclosure. The wireless communication system 100 includes UEs 102, 103, and base stations 104, 106A, 106B that are connected to a core network (CN) 110. The base stations 104, 106A, 106B can be any suitable type, or types, of base stations, such as an evolved node B (eNB), a next-generation eNB (ng-eNB), or a 5G Node B (gNB), for example. As a more specific example, the base station 104 can be an eNB or a gNB, and the base stations 106A and 106B can be gNBs. The base stations form a radio access network (RAN) 105.

The base station 104 supports a cell 124, the base station 106A supports a cell 126A, and the base station 106B supports a cell 126B. The base station 106A may additionally support a cell 125A. The cell 124 partially overlaps with both of cells 126A and 126B, such that the UE 102 can be in range to communicate with base station 104 while simultaneously being in range to communicate with base station 106A or 106B (or in range to detect or measure the signal from both base stations 106A or 106B, etc.). The overlap can make it possible for the UE 102 to hand over between cells (e.g., from cell 124 to cell 126A or 126B) or base stations (e.g., from base station 104 to base station 106A or base station 106B) before the UE 102 experiences radio link failure, for example. Moreover, the overlap allows the various dual connectivity (DC) scenarios discussed below. For example, the UE 102 can communicate in DC with the base station 104 (operating as an MN) and the base station 106A (operating as an SN) and, upon completing a handover, can communicate with the base station 106B (operating as an MN). As another example, the UE 102 can communicate in DC with the base station 104 (operating as an MN) and the base station 106A (operating as an SN) and, upon completing an SN change, can communicate with the base station 104 (operating as an MN) and the base station 106B (operating as an SN).

More particularly, when the UE 102 is in DC with the base station 104 and the base station 106A, the base station 104 operates as a master eNB (MeNB), a master ng-eNB (Mng-eNB), or a master gNB (MgNB), and the base station 106A operates as a secondary gNB (SgNB) or a secondary ng-eNB (Sng-eNB). In implementations and scenarios where the UE 102 is in SC with the base station 104 but is capable of operating in DC, the base station 104 operates as an MeNB, an Mng-eNB or an MgNB, and the base station 106A operates as a candidate SgNB (C-SgNB) or a candidate Sng-eNB (C-Sng-eNB). Although various scenarios are described below in which the base station 104 operates as an MN and the base station 106A (or 106B) operates as an SN or T-SN, any of the base stations 104, 106A, 106B generally can operate as an MN, an SN or a T-SN in different scenarios. Thus, in some implementations, the base station 104, the base station 106A, and the base station 106B can implement similar sets of functions and each support MN, SN, and T-SN operations.

In operation, the UE 102 can use a radio bearer (e.g., a DRB or an SRB) that at different times terminates at an MN (e.g., the base station 104) or an SN (e.g., the base station 106A). For example, after handover to the base station 106B, the UE 102 can use a radio bearer (e.g., a DRB or an SRB) that at different times terminates at the base station 106B. The UE 102 can apply one or more security keys when communicating on the radio bearer, in the uplink (from the UE 102 to a base station) and/or downlink (from a base station to the UE 102) direction.

In some scenarios, the UE 102 performs sidelink communications (e.g., for V2X or a proximity service) with the UE 103 via a sidelink 128. The sidelink communication can be NR sidelink communication and/or V2X sidelink communication. When the UE 102 is within the area of coverage of the RAN 105, one or more base stations of the RAN 105 can configure and control the sidelink communication via dedicated signaling (e.g., an RRC reconfiguration message) or broadcast system information (e.g., system information block(s)).

When the UE 102 operates in the RRC_CONNECTED state, the UE 102 can send a SidelinkUEInformation message to the RAN 105 to request or release sidelink resources for the sidelink communication and/or report QoS information for each destination in the sidelink communication. For example, the RAN 105 provides RRCReconfiguration to the UE 102 in order to provide the UE with dedicated sidelink configuration after the RAN 105 receives the SidelinkUE-Information message. The RRCReconfiguration can include a sidelink radio bearer (SLRB) configuration for NR sidelink communication as well as sidelink scheduling configuration or resource pool configuration. If UE 102 has received an SLRB configuration via a system information broadcast, the UE 102 should continue using the configuration to perform sidelink data transmissions and receptions until the UE 102 receives a new configuration via the RRCReconfiguration. During handover, the UE 102 performs sidelink communications (e.g., transmission and/or reception) based on configuration of the exceptional transmission resource pool or configured sidelink grant Type 1 and/or reception resource pool of a target cell as provided in a handover command message.

The base station 104 includes processing hardware 130, which can include one or more general-purpose processors (e.g., central processing units (CPUs) and a computer-readable memory storing machine-readable instructions executable on the one or more general-purpose processor(s), and/or special-purpose processing units. The processing hardware 130 in the example of FIG. 1A implements a base station sidelink controller 132 configured to manage or control sidelink configurations and procedures. For example, the base station sidelink controller 132 can be configured to support RRC messaging associated with sidelink configuration and procedures. Further, when the base station 104 is distributed (see FIG. 1B below), the base station sidelink controller 132 can include a CU component 133A operating in the CU and a respective DU component 133B operating in each of the DUs. The CU component 133A and the DU component 133B can communicate via a dedicated interface illustrated in FIG. 1B.

The processing hardware 130 also includes a base station Uu link controller 134 that is configured to manage or control a Uu link (i.e., a link between the UE 102 and the base station 104). For example, the base station Uu link controller 134 can be configured to support RRC messaging associated with RRC procedures for managing or controlling radio resources for the UE 102 to communicate with the base station 104, and/or to support the necessary operations when the base station 104 operates as an MN, as discussed below.

The base station 106A includes processing hardware 140, which can include one or more general-purpose processors (e.g., CPUs) and a computer-readable memory storing machine-readable instructions executable on the general-purpose processor(s), and/or special-purpose processing units. The processing hardware 140 in the example implementation in FIG. 1A includes a base station sidelink controller 142 that is configured to manage or control sidelink configurations and procedures. For example, the base station sidelink controller 142 can be configured to support RRC messaging associated with sidelink configuration and procedures. The processing hardware 140 includes a base station Uu link controller 144 that is configured to manage or control a Uu link (i.e., a link between the UE 102 and the base station 104). For example, the base station Uu link controller 144 can be configured to support RRC messaging associated with RRC procedures for managing or controlling radio resources for the UE 102 to communicate with the base station 104, and/or to support the necessary operations when the base station 104 operates as an MN or SN, as discussed below.

The UE 102 includes processing hardware 150, which can include one or more general-purpose processors (e.g., CPUs) and a computer-readable memory storing machine-readable instructions executable on the general-purpose processor(s), and/or special-purpose processing units. The processing hardware 150 in the example implementation in FIG. 1A includes a UE sidelink controller 152 that is configured to manage or control sidelink configurations and procedures. For example, the UE sidelink controller 152 can be configured to support RRC messaging associated with sidelink configuration and procedures. The processing hardware 150 includes a UE Uu link controller 154 that is configured to manage or control a Uu link (i.e., a link between the UE 102 and the RAN 105) according configuration parameters received from the RAN 105. For example, the UE Uu link controller 152 can be configured to support RRC messaging associated with RRC procedures for managing or controlling radio resources in accordance with any of the implementations discussed below.

The CN 110 can be an evolved packet core (EPC) 111 or a fifth-generation core (5GC) 160, both of which are depicted in FIG. 1A. The base station 104 can be an eNB supporting an Si interface for communicating with the EPC 111, an ng-eNB supporting an NG interface for communicating with the 5GC 160, or as a gNB that supports the NR radio interface as well as an NG interface for communicating with the 5GC 160. The base station 106A can be an EN-DC gNB (en-gNB) with an Si interface to the EPC 111, an en-gNB that does not connect to the EPC 111, a gNB that supports the NR radio interface and an NG interface to the 5GC 160, or a ng-eNB that supports an EUTRA radio interface and an NG interface to the 5GC 160. To directly exchange messages with each other during the scenarios discussed below, the base stations 104, 106A, and 106B can support an X2 or Xn interface.

Among other components, the EPC 111 can include a Serving Gateway (SGW) 112, a Mobility Management Entity (MME) 114 and a Packet Data Network (PDN) Gateway (PGW) 116. The S-GW 112 and/or PGW 116 is/are generally configured to transfer user-plane packets related to audio calls, video calls, Internet traffic, etc., and the MME 114 is configured to manage authentication, registration, paging, and other related functions. The 5GC 160 includes a User Plane Function (UPF) 162 and an Access and Mobility Management (AMF) 164, and/or Session Management Function (SMF) 166. The UPF 162 is generally configured to transfer user-plane packets related to audio calls, video calls, Internet traffic, etc., the AMF 164 is configured to manage authentication, registration, paging, and other related functions, and the SMF 166 is configured to manage PDU sessions.

Generally, the wireless communication network 100 can include any suitable number of base stations supporting NR cells and/or EUTRA cells. More particularly, the EPC 111 or the 5GC 160 can be connected to any suitable number of base stations supporting NR cells and/or EUTRA cells. Although the examples below refer specifically to specific CN types (EPC, 5GC) and RAT types (5G NR and EUTRA), in general the techniques of this disclosure can also apply to other suitable radio access and/or core network technologies such as sixth generation (6G) radio access and/or 6G core network or 5G NR-6G DC, for example.

In different configurations or scenarios of the wireless communication system 100, the base station 104 can operate as an MeNB, an Mng-eNB, or an MgNB, the base station 106B can operate as an MeNB, an Mng-eNB, an MgNB, an SgNB, or an Sng-eNB, and the base station 106A can operate as an SgNB or an Sng-eNB. The UE 102 can communicate with the base station 104 and the base station 106A or 106B via the same radio access technology (RAT), such as EUTRA or NR, or via different RATs.

When the base station 104 is an MeNB and the base station 106A is an SgNB, the UE 102 can be in EUTRA-NR DC (EN-DC) with the MeNB 104 and the SgNB 106A. When the base station 104 is an Mng-eNB and the base station 106A is an SgNB, the UE 102 can be in next generation (NG) EUTRA-NR DC (NGEN-DC) with the Mng-eNB 104 and the SgNB 106A. When the base station 104 is an MgNB and the base station 106A is an SgNB, the UE 102 can be in NR-NR DC (NR-DC) with the MgNB 104 and the SgNB 106A. When the base station 104 is an MgNB and the base station 106A is a Sng-eNB, the UE 102 can be in NR-EUTRA DC (NE-DC) with the MgNB 104 and the Sng-eNB 106A.

Figure 1B:
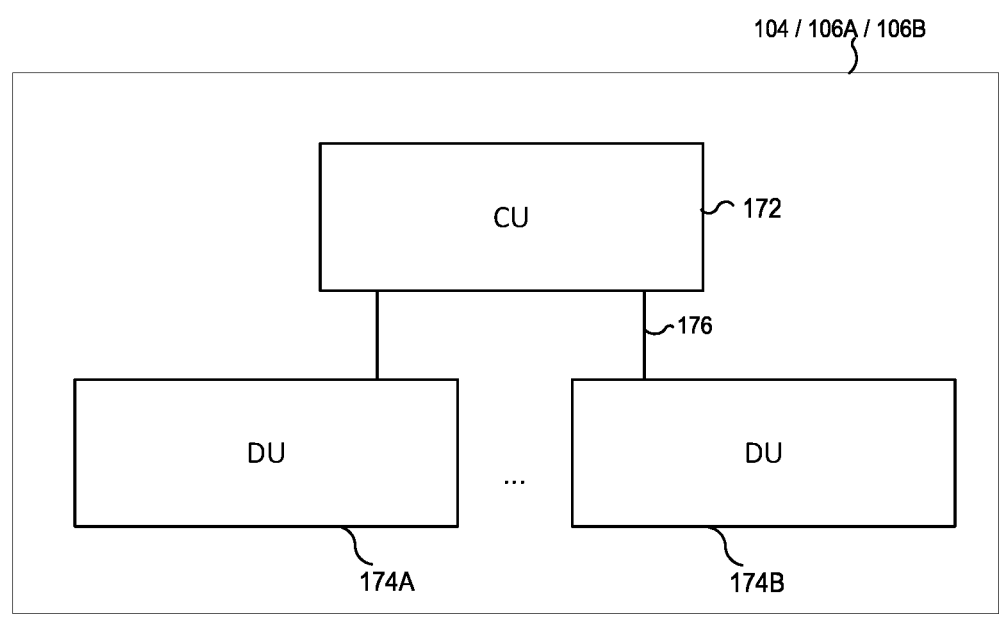
FIG. 1B is a block diagram of an example base station in which a centralized unit (CU) and a distributed unit (DU) can operate in the system of FIG. 1A.

FIG. 1B depicts an example distributed implementation of any one or more of the base stations 104, 106A, 106B. In this implementation, the base station 104, 106A, or 106B includes a centralized unit (CU) 172 and one or more distributed units (DUs) 174. The CU 172 and the DU(s) 174 can communicate via a dedicated interface 176 (e.g., Fs-U for user plane, Fs-C for control plane).

The CU 172 includes processing hardware, such as one or more general-purpose processors (e.g., CPUs) and a computer-readable memory storing machine-readable instructions executable on the general-purpose processor(s), and/or special-purpose processing units. The CU 172 can include the processing hardware 130 or 140 of FIG. 1A. In an example implementation, the processing hardware of the CU 172 includes the CU module 133A of the base station sidelink controller 132.

Each of the DUs 174 also includes processing hardware that can include one or more general-purpose processors (e.g., CPUs) and computer-readable memory storing machine-readable instructions executable on the one or more general-purpose processors, and/or special-purpose processing units. For example, the processing hardware can include a medium access control (MAC) controller configured to manage or control one or more MAC operations or procedures (e.g., a random access procedure), and a radio link control (RLC) controller configured to manage or control one or more RLC operations or procedures when the base station (e.g., base station 106A) operates as a MN or an SN. The process hardware can also include a physical layer controller configured to manage or control one or more physical layer operations or procedures. In an example implementation, the processing hardware of each DU 174 includes the DU module 133B of the base station sidelink controller 132.

Figure 2A:
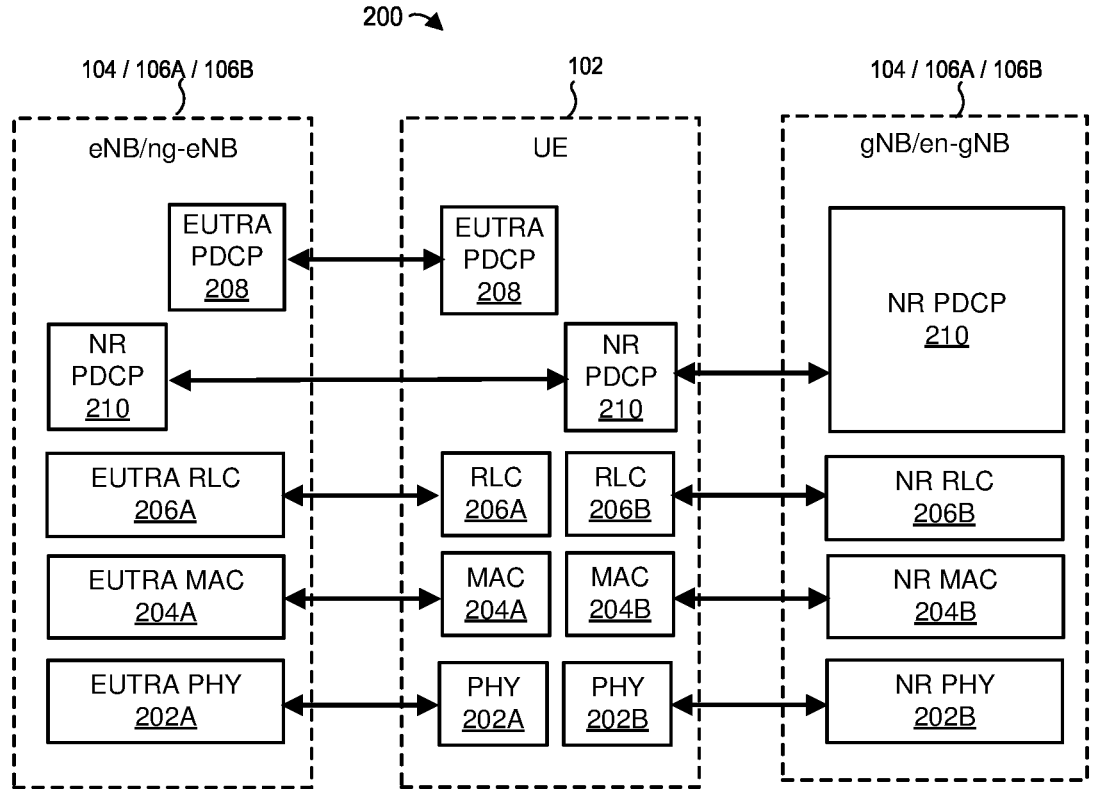
FIG. 2A is a block diagram of an example protocol stack according to which the UE of FIG. 1A can communicate with base stations of FIG. 1A.

FIG. 2A illustrates, in a simplified manner, an example protocol stack 200 according to which the UE 102 can communicate with an eNB/ng-eNB or a gNB (e.g., one or more of the base stations 104, 106A, 106B).

In the example stack 200, a physical layer (PHY) 202A of EUTRA provides transport channels to the EUTRA MAC sublayer 204A, which in turn provides logical channels to the EUTRA RLC sublayer 206A. The EUTRA RLC sublayer 206A in turn provides RLC channels to the EUTRA PDCP sublayer 208 and, in some cases, to the NR PDCP sublayer 210. Similarly, the NR PHY 202B provides transport channels to the NR MAC sublayer 204B, which in turn provides logical channels to the NR RLC sublayer 206B.

The NR RLC sublayer 206B in turn provides RLC channels to the NR PDCP sublayer 210. The UE 102, in some implementations, supports both the EUTRA and the NR stack as shown in FIG. 2A, to support handover between EUTRA and NR base stations and/or to support DC over EUTRA and NR interfaces. Further, as illustrated in FIG. 2A, the UE 102 can support layering of NR PDCP 210 over EUTRA RLC 206A.

The EUTRA PDCP sublayer 208 and the NR PDCP sublayer 210 receive packets (e.g., from an Internet Protocol (IP) layer, layered directly or indirectly over the PDCP layer 208 or 210) that can be referred to as service data units (SDUs), and output packets (e.g., to the RLC layer 206A or 206B) that can be referred to as protocol data units (PDUs). Except where the difference between SDUs and PDUs is relevant, this disclosure for simplicity refers to both SDUs and PDUs as "packets."

On a control plane, the EUTRA PDCP sublayer 208 and the NR PDCP sublayer 210 can provide SRBs to exchange RRC messages, for example. On a user plane, the EUTRA PDCP sublayer 208 and the NR PDCP sublayer 210 can provide DRBs to support data exchange.

In scenarios where the UE 102 operates in EUTRA/NR DC (EN-DC), with the base station 104 operating as an MeNB and the base station 106A operating as an SgNB, the wireless communication system 100 can provide the UE 102 with an MN-terminated bearer that uses EUTRA PDCP sublayer 208, or an MN-terminated bearer that uses NR PDCP sublayer 210. The wireless communication system 100 in various scenarios can also provide the UE 102 with an SN-terminated bearer, which uses only the NR PDCP sublayer 210. The MN-terminated bearer can be an MCG bearer or a split bearer. The SN-terminated bearer can be an SCG bearer or a split bearer. The MN-terminated bearer can be an SRB (e.g., SRB1 or SRB2) or a DRB. The SN-terminated bearer can be an SRB or a DRB.

Figure 2B:
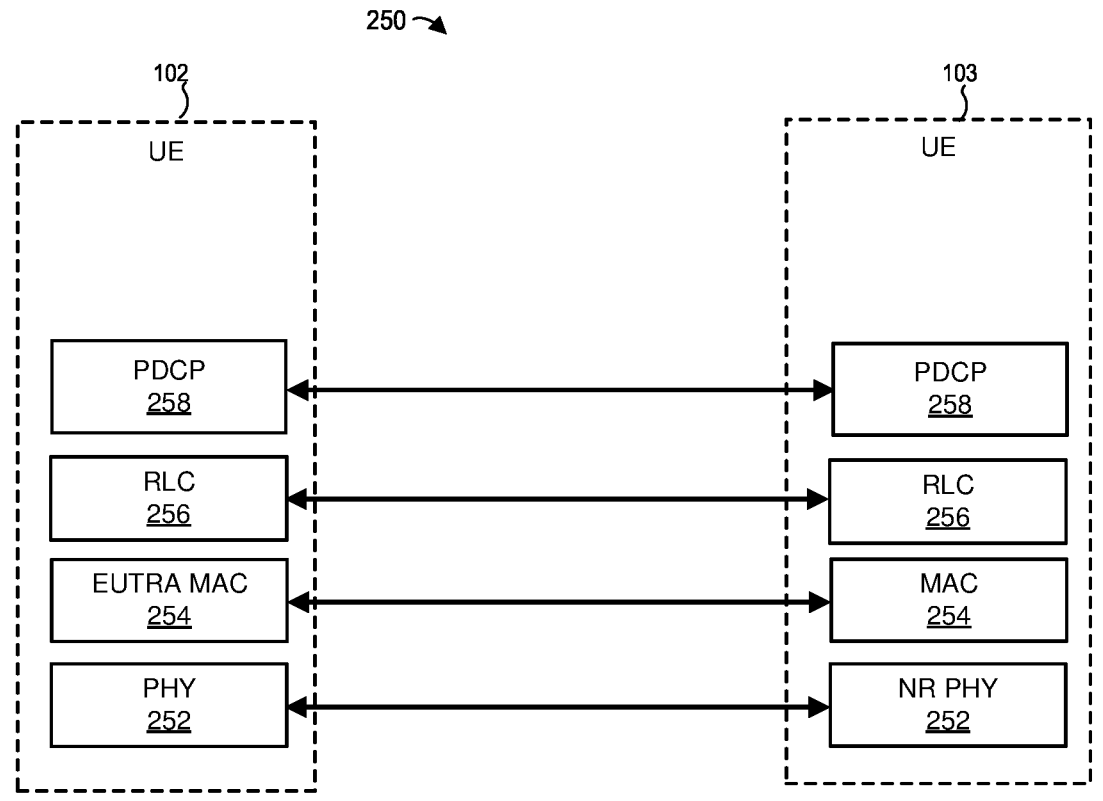
FIG. 2B is a block diagram of an example protocol stack according to which the UEs of FIG. 1A can communicate directly, without the RAN.

FIG. 2B illustrates, in a simplified manner, an example protocol stack 250 for sidelink communication between the UE 102 and the UE 103.

In the example stack 250, a physical layer (PHY) 252 provides transport channels to the MAC sublayer 254, which in turn provides logical channels to the RLC sublayer 256. The RLC sublayer 256 in turn provides RLC channels to the PDCP sublayer 258. In some implementations, the example stack 250 can comply to EUTRA or NR.

The PDCP sublayer 258 receive packets (e.g., from an Internet Protocol (IP) layer, layered directly or indirectly over the PDCP layer 258) that can be referred to as service data units (SDUs), and output packets (e.g., to the RLC layer 256) that can be referred to as protocol data units (PDUs). Except where the difference between SDUs and PDUs is relevant, this disclosure for simplicity refers to both SDUs and PDUs as "packets". On a control plane, the PDCP sublayer 258 can provide one or more sidelink SRBs to exchange RRC messages between the UEs 102 and 103, for example. On a user plane, the PDCP sublayer 258 can provide sidelink one or more DRBs to support data exchange between the UEs 102 and 103.

Figure 3A:
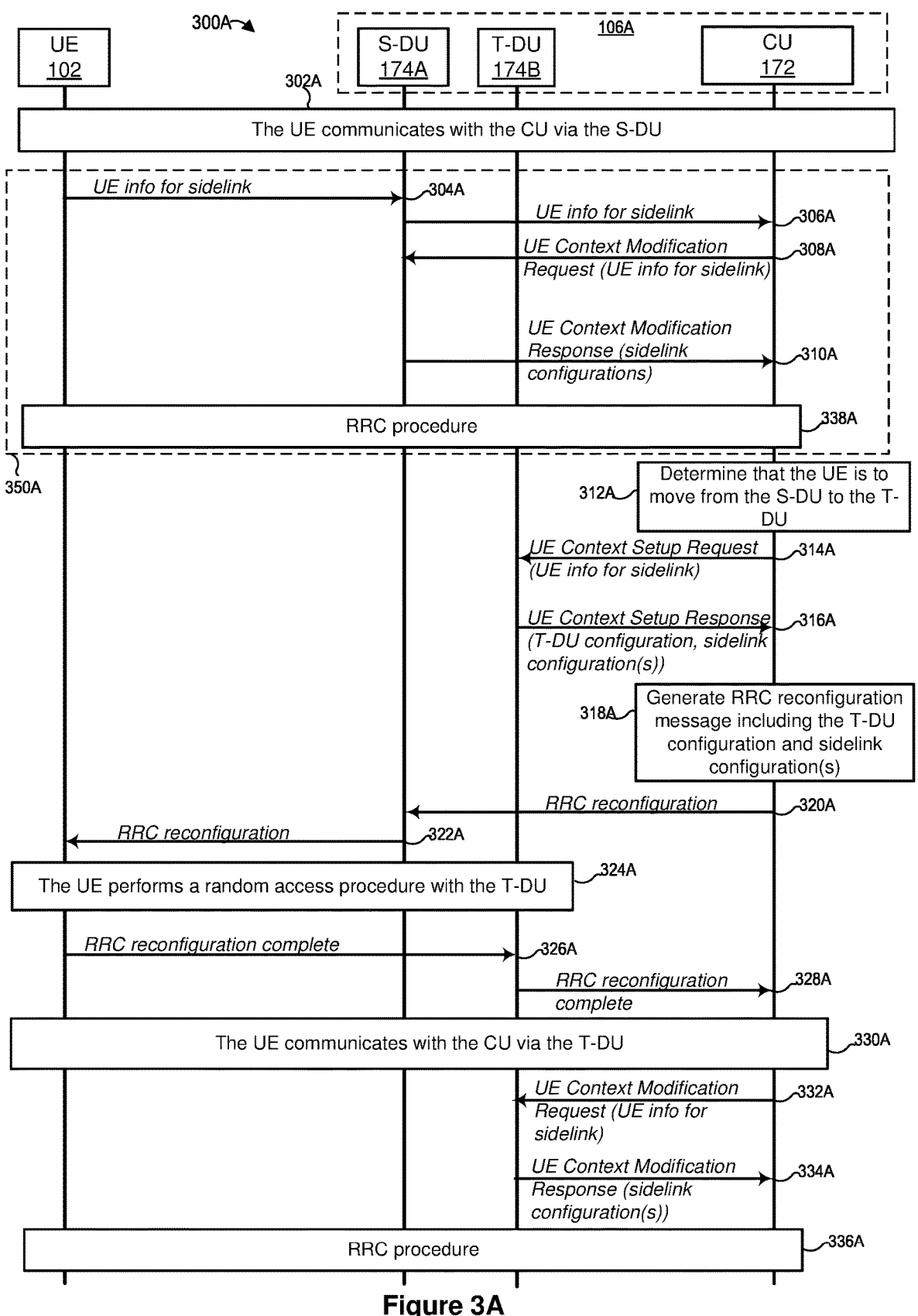
FIG. 3A is a messaging diagram of an example scenario in which a CU receives UE information for sidelink communication for a UE, reconfigures the radio connection of the UE to terminate at a target DU, and provides the UE information for sidelink communication to the target DU.
Figure 3B:
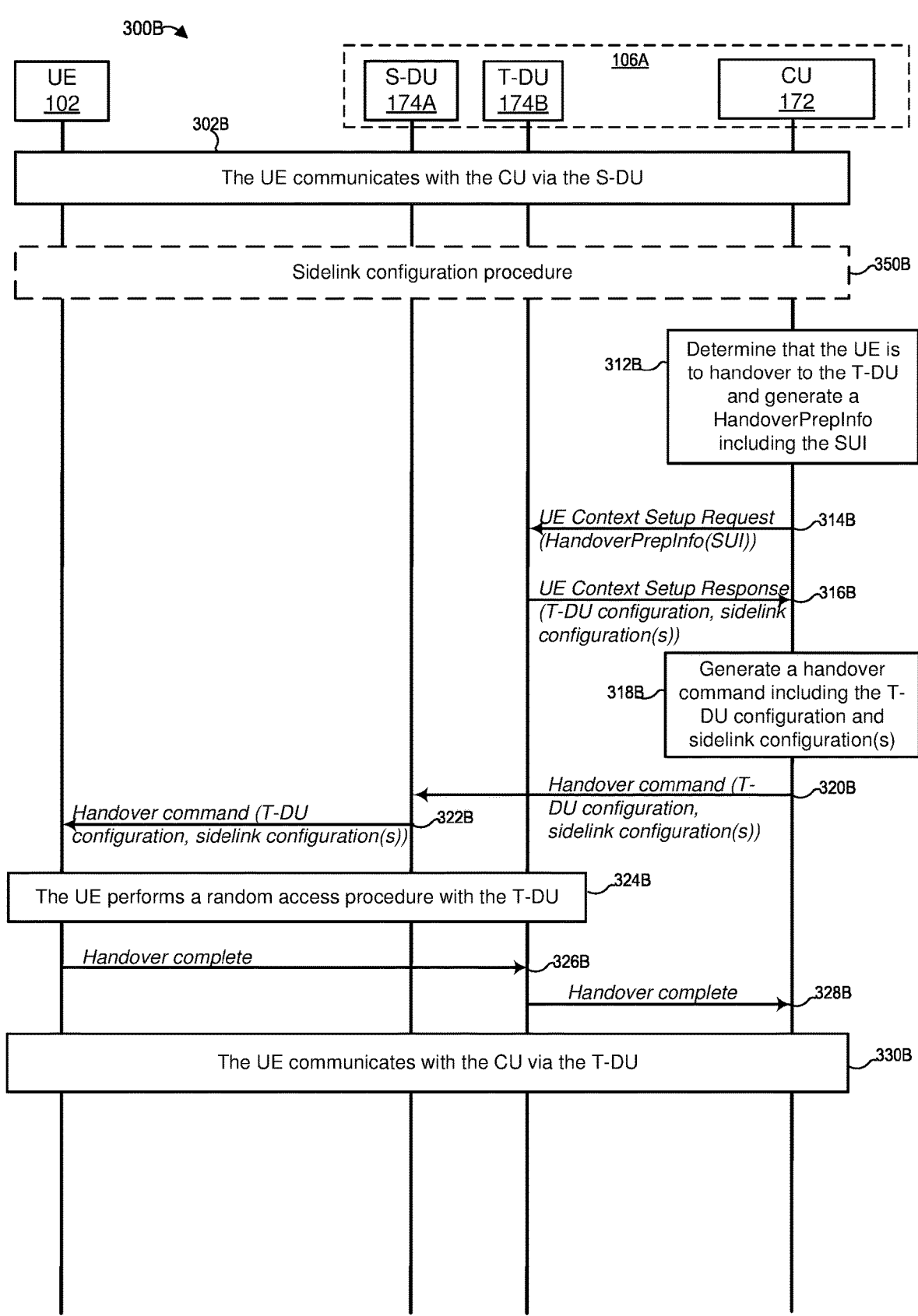
FIG. 3B is a messaging diagram of an example scenario in which a CU receives UE information for sidelink communication for a UE, initiates a handover of the UE to target DU, and provides the UE information for sidelink communication to the target DU using a handover preparation information IE.
Figure 3C:
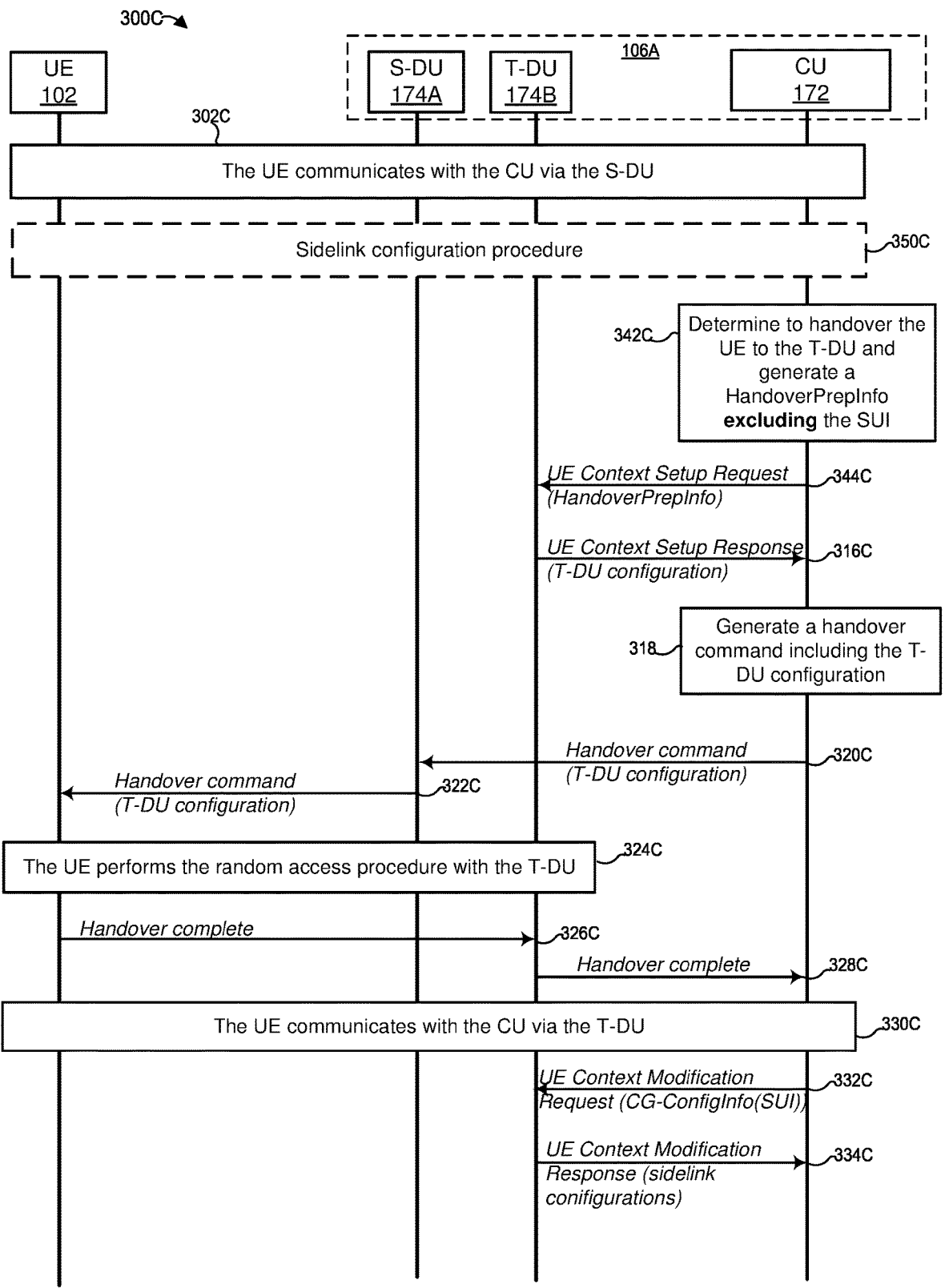
FIG. 3C is a messaging diagram of an example scenario in which a CU receives UE information for sidelink communication for a UE, initiates a handover of the UE to target DU, and provides the UE information for sidelink communication to the target DU only after the handover completes.
Figure 3D:
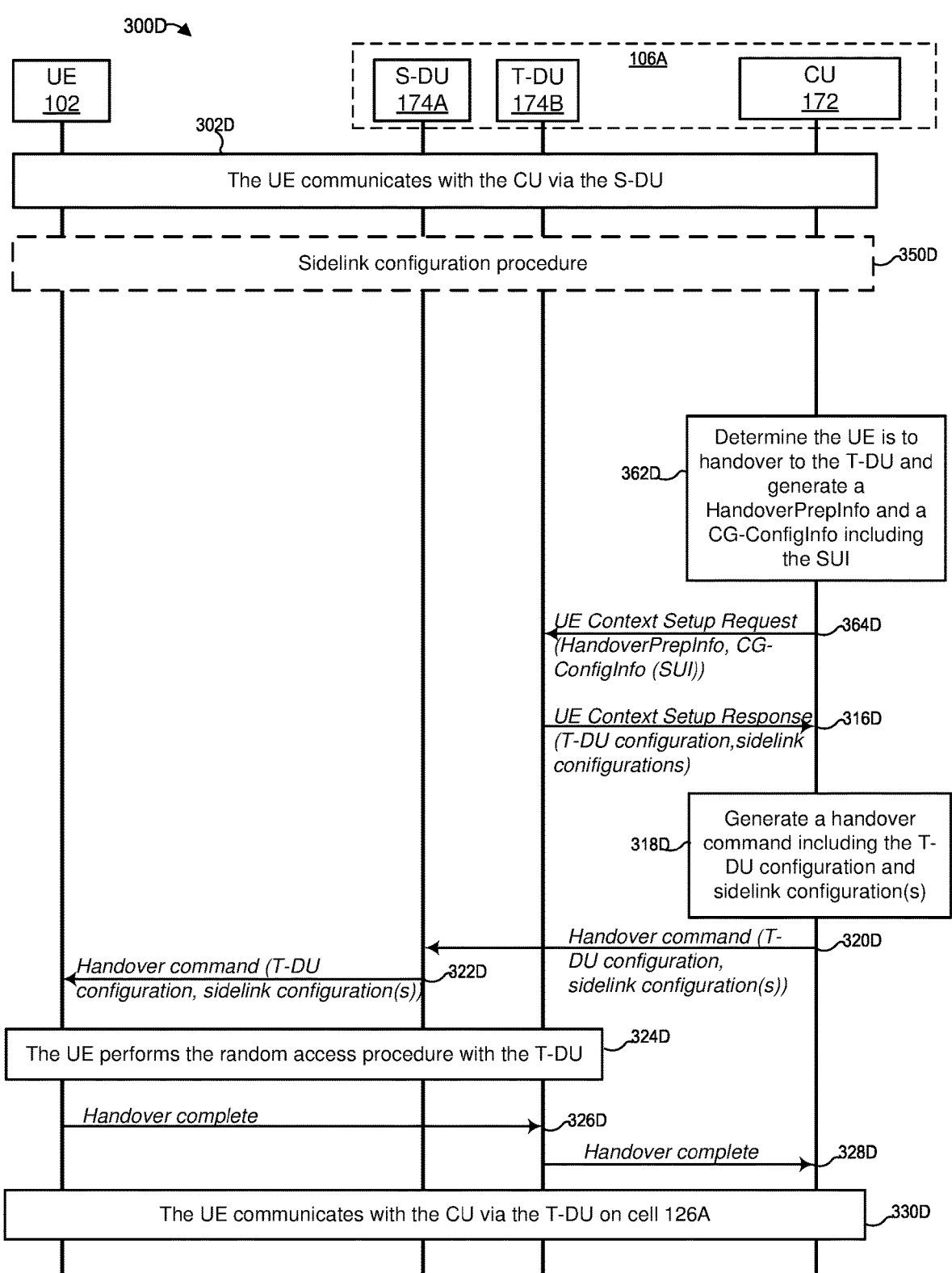
FIG. 3D is a messaging diagram of an example scenario in which a CU receives UE information for sidelink communication for a UE, initiates a handover of the UE to target DU, and provides the UE information for sidelink communication to the target DU using a cell group configuration IE that in turn includes a Sidelink UE Information (SUI) IE.
Figure 4A:
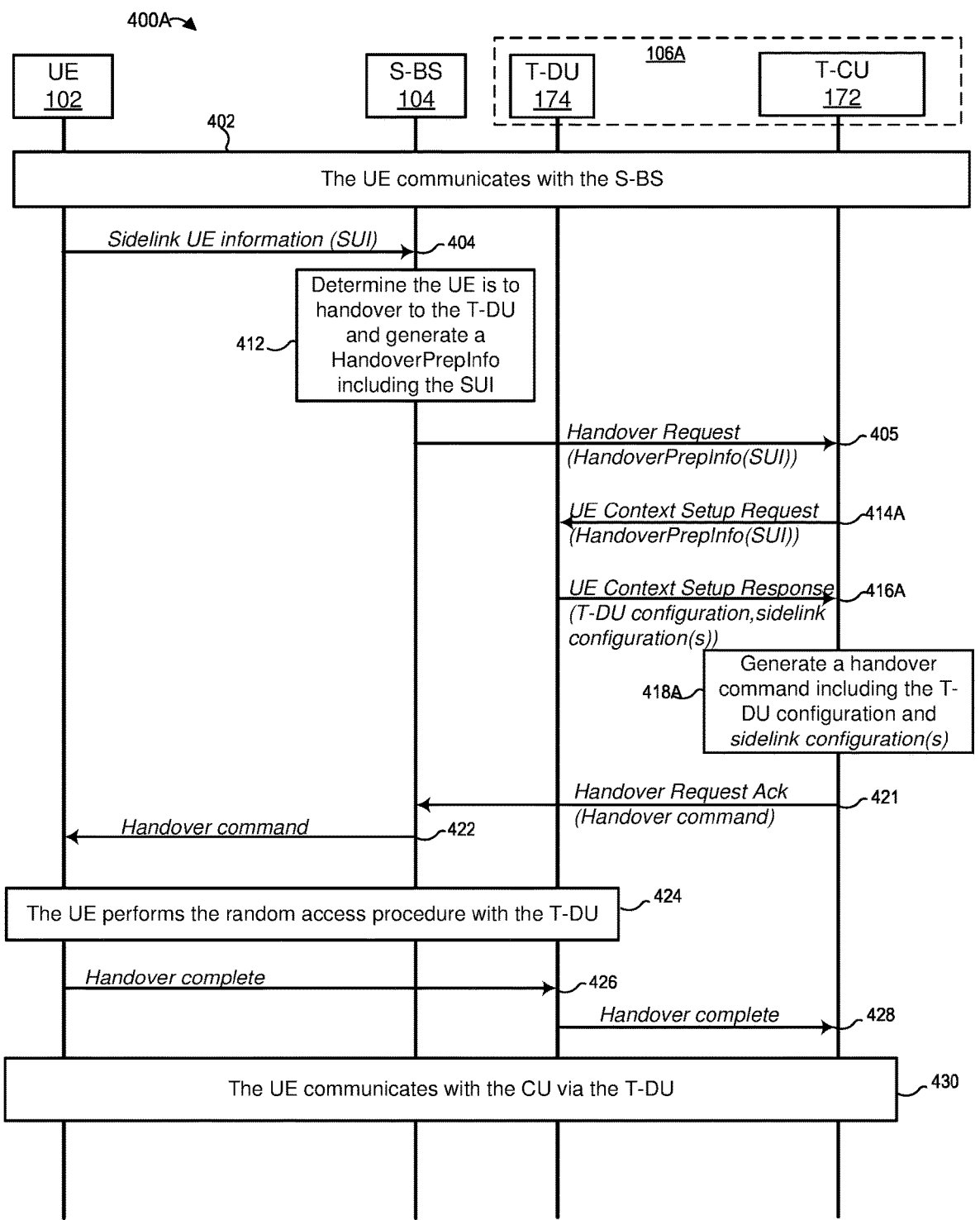
FIG. 4A is a messaging diagram of an example scenario generally similar to that of FIG. 3B, but with the handover occurring between different base stations rather than different DUs.
Figure 4C:
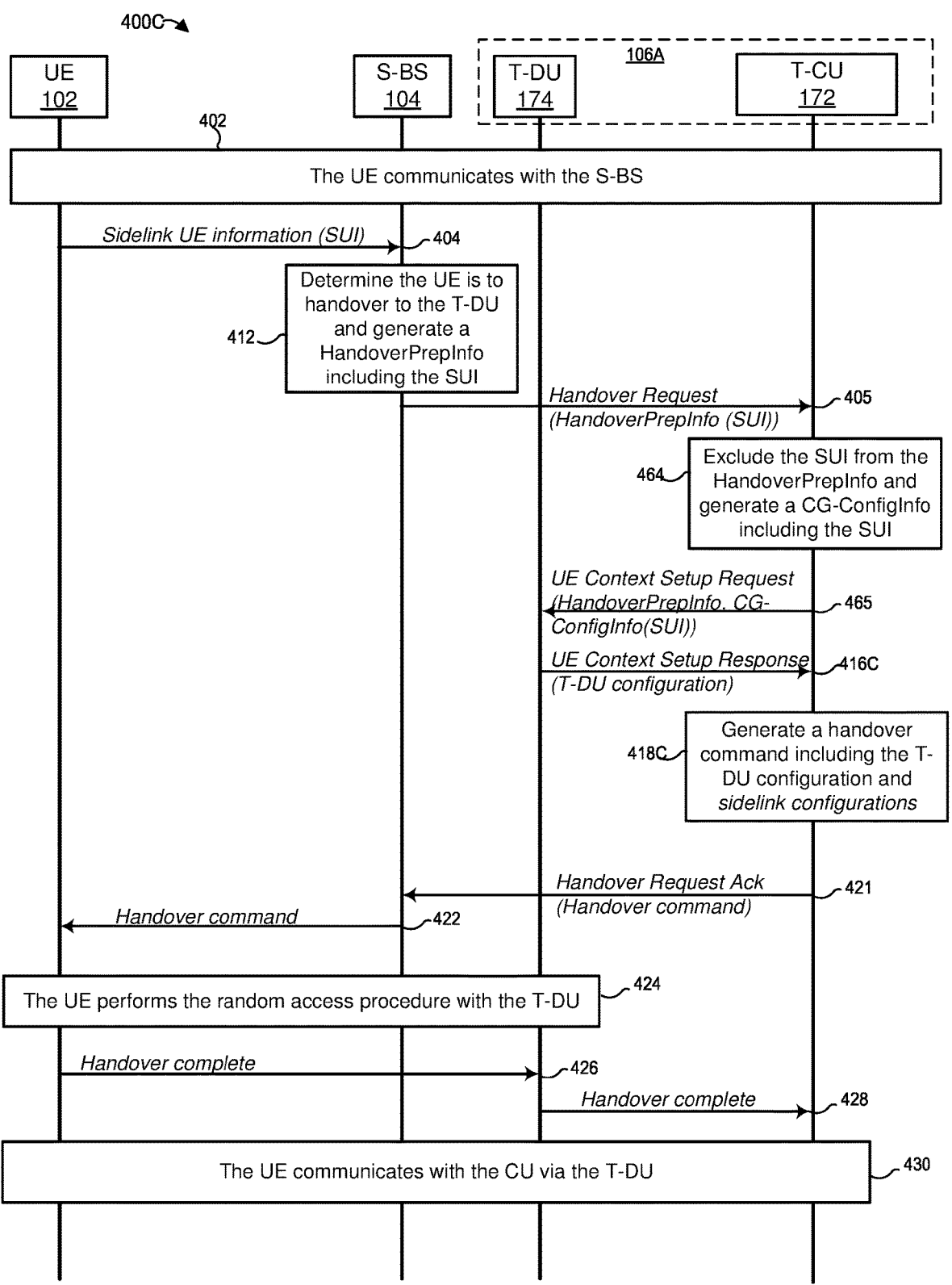
FIG. 4C is a messaging diagram of an example scenario generally similar to that of FIG. 3D, but with the handover occurring between different base stations rather than different DUs.

Now referring to FIGS. 3A-4C, the UE 102 in some scenarios UE information for sidelink to a CU via a source DU of a distributed base station, and then the UE 102 or the base station initiates a process of connecting the UE 102 to a different DU, or "target" DU. The CU of this disclosure provides, to the target DU, both the UE information for sidelink and information related to the procedure for connecting to the cell of the target DU. More particularly, FIG. 3A pertains to single connectivity and dual connectivity scenarios in which the UE 102 transmits UE information for sidelink to a CU via a source DU using an RRC message and then changes the connection to a target DU. FIGS. 3B-3D illustrate handover scenarios in which the UE 102 transmits UE information for sidelink to a CU via a source DU and then performs a handover to a target DU, to which the CU provides the relevant handover and sidelink information. FIGS. 4A-4C then illustrate handover scenarios in which the UE 102 transmits UE information for sidelink to a source base station and then performs a handover to a target base station including a target DU and a target CU.

Referring first to a scenario 300A of FIG. 3A, the base station 106A includes a DU 174A, a DU 174B and a CU 172. Initially, the UE 102 communicates 302A with the CU 172 via a source DU (S-DU) 174, e.g., on cell 125A. In some implementations, the UE 102 is in single connectivity (SC) with the base station 106A. In other implementations, the UE 102 is in dual connectivity (DC) with base 106A and base station 104 (not shown in FIG. 3A), where the base station 106A can operate as a MN or SN.

The UE 102 at some point transmits 304A UE information for sidelink to the S-DU 174A, which in turn transmits 306A the UE information for sidelink to the CU 172. The S-DU 174A in this case tunnels the UE information to the CU 172 without processing this information. After receiving the UE information for sidelink, the CU 172 can transmit 308A a request to set up a context of the UE, e.g., a UE Context Modification Request message, to the S-DU 174A. The request can include the UE information for sidelink. The S-DU 174A then generates first sidelink configuration(s) for the UE 102 according to the UE information for sidelink.

Next, the S-DU 174A transmits 310A a UE Context Modification Response message to the CU 172 in response to the UE Context Modification Request message. The S-DU 174A can include the first sidelink configuration(s) in the UE Context Modification Response message. Alternatively, the S-DU 174A can send a UE Context Modification Required message including the first sidelink configuration(s) to the CU 172, and the CU 172 then can send a UE Context Modification Confirm message in response. In this case, the S-DU 174A may not include the first sidelink configuration(s) in the UE Context Modification Response message.

After receiving the first sidelink configuration(s), the CU 172 performs 338A an RRC procedure (e.g., an RRC reconfiguration procedure) to send the first sidelink configuration(s) to the UE 102. For example, the CU 172 sends an RRC message including the first sidelink configuration(s) to the S-DU 174A, which in turn transmits the RRC message to the UE 102. The UE 102 can use the first sidelink configuration(s) to perform sidelink communicate with the UE 103. In some implementations, the UE 102 can transmit an RRC response message to the S-DU 174A which in turn sends the RRC response message to the CU 172. In some implementations, the RRC message and the RRC response message can be a RRCReconfiguration message and a RRCReconfigurationComplete message. The events 304A, 306A, 308A, 310A and 338A are collectively referred to in FIG. 3A as a sidelink configuration procedure 350A.

After receiving the UE information for sidelink, the CU 172 can determine 312A that the UE 102 should transition from the S-DU 174A to the T-DU 174B (e.g., configure the UE 102 to perform handover or a PSCell change to the T-DU 174B from the S-DU 174A). In some implementations, the CU 172 may make the determination in response to one or more measurement results that exceeds (e.g., above or below) one or more predetermined thresholds, or calculating a filtered result (from the measurement result(s)) that is above (or below) a predetermined threshold. The one or more measurement results may indicate that the UE 102 should transition to cell 126A operated by the T-DU 174B. The CU 172 can receive the one or more measurement results from the S-DU 174A, which in turn can receive these measurement results from the UE 102. Alternatively, the S-DU 174A can generate the one or more measurement results by measuring transmissions from the UE 102.

In response to the determination 312A, the CU 172 transmits 314A a UE Context Setup Request message including the UE information for sidelink to the T-DU 174B. The T-DU 174B can generate second sidelink configuration(s) for the UE 102 according to the UE information for sidelink. The T-DU 174B transmits 316A a UE Context Setup Response message to the CU 172 in response to the UE Context Setup Request message. The T-DU 174B can include a T-DU configuration and the second sidelink configuration(s) in the UE Context Setup Response message. Alternatively, after receiving the UE information for sidelink, the T-DU 174B can transmit a UE Context Modification Required message including the second sidelink configuration(s) to the CU 172, and the CU 172 can transmit a UE Context Modification Confirm message in response. In this case, the T-DU 174B may not include the second sidelink configuration(s) in the UE Context Setup Response message.

Depending on the implementation, the CU 172 may or may include a S-DU configuration in the UE Context Setup Request message. In some implementations, the T-DU 174B can generate the T-DU configuration which augments the S-DU configuration. In other implementations, the T-DU 174B can generate the T-DU configuration which is a complete configuration not based on the S-DU configuration.

In some implementations, the S-DU 174A can generate the first sidelink configuration(s) according to the UE information for sidelink. Similarly, the T-DU 174B can generate the second sidelink configuration(s) according the UE information for sidelink. Depending on the implementation, the CU 172 might include or might exclude the first sidelink configuration(s) in the UE Context Setup Request message. In some implementations, the T-DU 174B can generate the second sidelink configuration(s) which augments the first sidelink configuration(s). In other implementations, the T-DU 174B can generate the second sidelink configuration(s) which are complete configuration(s) not based on the first sidelink configuration(s).

After receiving the second sidelink configuration(s), the CU 172 transmits 320A an RRC reconfiguration message including the second sidelink configuration(s) to the T-DU 174B, which in turn transmits 322A the RRC reconfiguration message to the UE 102. The UE 102 can use the second sidelink configuration(s) to perform sidelink communication with the UE 103 (see FIG. 1A). The UE 102 may perform 324A a random access procedure with the T-DU 174B in response to the RRC reconfiguration message. During or after the random access procedure, the UE 102 can transmit 326A an RRC reconfiguration complete message to the T-DU 174B which in turn sends 328A the RRC reconfiguration complete message to the CU 172. After performing the random access procedure or transmitting the RRC reconfiguration complete message, the UE 102 communicates 330A with the CU via the T-DU 174B according to configuration parameters in the T-DU configuration or RRC reconfiguration message.

In some implementations, the CU 172 might not include the UE information for sidelink in the UE Context Setup Request message at event 314A. Instead, the CU 172 can transmit 332A a UE Context Modification Request message including the UE information for sidelink to the T-DU 174B after event 314A. For example, the CU 172 can send 332A the UE Context Modification Request message after the UE hands over to the T-DU 174B. After receiving the UE information for sidelink, the T-DU 174B can generate second sidelink configuration(s) for the UE 102 according to the UE information for sidelink. The T-DU 174B transmits 334A a UE Context Modification Response message including the second sidelink configuration(s) to the CU 172 in response to the UE Context Modification Request message. Alternatively, after receiving the UE information for sidelink, the T-DU 174B can send a UE Context Modification Required message including the second sidelink configuration(s) to the CU 172, and the CU 172 can transmit a UE Context Modification Confirm message in response. In this alternative, the T-DU 174B may not include the second sidelink configuration(s) in the UE Context Modification Response message 334A. Then the T-DU 174B can perform a 336A an RRC procedure to send the second sidelink configuration(s) via the T-DU 174B, similar to the RRC procedure 338A.

In some implementations, the UE 102 performs the random access procedure via the cell 126A with the T-DU 174B according to configuration parameters in the RRC reconfiguration message or the T-DU configuration. In some implementations, the random access procedure can be a two-step or four-step random access procedure. In other implementations, the random access procedure can be a contention-based random access procedure or a contention-free random access procedure.

In some implementations, the S-DU 174A can generate at least one non-sidelink configuration parameter for the UE 102 according to (e.g., based on or considering) the UE information for sidelink, include the at least one non-sidelink configuration parameter in a S-DU configuration and transmit 310A the S-DU configuration to the CU 172 in the UE Context Modification Response or the UE Context Modification Complete message described above. The CU 172 can send the S-DU configuration to the UE 102 via the S-DU 174A in the RRC message during the RRC procedure 338A. Alternatively, the CU 172 can perform another RRC procedure to send the S-DU configuraiton to the UE via the S-DU 174A, similar to the RRC procedure 338A.

Similarly, the T-DU 174B can generate at least one non-sidelink configuration parameter for the UE 102 according to (e.g., based on or considering) the UE information for sidelink, include the at least one non-sidelink configuration parameter in the T-DU configuration and transmit 334A the T-DU configuration to the CU 172 in the UE Context Setup Response, the UE Context Modification Response or the UE Context Modification Complete message described above. When the message is UE Context Setup Response, the CU 172 can transmit the T-DU configuration to the UE 102 via the T-DU 174B in the RRC reconfiguration message 320A. When the message is UE Context Modification Response or UE Context Modification Confirm message, the CU 172 can transmit the T-DU configuraiton to the UE via the T-DU 174B during the RRC procedure 336A, similar to the RRC procedure 338A. Alternatively, the CU 172 can perform another RRC procedure (different from the RRC procedure 336A) to transmit the T-DU configuration to the UE via the T-DU 174B, similar to the RRC procedure 338A.

In some implementations, the at least one non-sidelink configuration parameter may reduce the chances of collision of the sidelink communication from uplink communication or downlink communication for the UE 102. For example, the uplink communication includes physical uplink shared channel (PUSCH) transmissions, physical uplink control channel (PUCCH), transmissions of channel state information (CSI) and/or transmissions of sounding reference signal(s). In another example, the downlink communication includes physical downlink shared channel (PDSCH) transmissions, physical downlink control channel (PDCCH) and/or transmissions of reference signal(s) (e.g., CSI-RS). In other implementations, the at least one non-sidelink configuration parameter may include a discontinous reception (DRX) configuration which directs the sidelink communication (i.e., sidelink transmissions or receptions) to occur at off-durations in DRX cycles configured by the DRX configuration. In yet other implementations, the at least one non-sidelink configuration parameter may include a measurement gap configuration which makes the sidelink communication occur at slots in gaps configured by the measurement gap configuration. In yet other implementations, the at least one non-sidelink configuration parameter may include a measurement gap configuration which makes the sidelink communication occur at slots not in gaps configured by the measurement gap configuration.

In some implementations, the at least one non-sidelink configuration parameter may configure the uplink communication and sidelink communication on the same carrier frequency. In other implementations, the at least one non-sidelink configuration parameter may configure the uplink communication and sidelink communication on different carrier frequencies.

In some implementations, the at least one non-sidelink configuration parameter may configure the uplink communication and sidelink communication on the same bandwidth part (BWP). In other implementations, the at least one non-sidelink configuration parameter may configure the uplink communication and sidelink communication on different BWPs.

In some implementations, the UE information for sidelink can include sidelink traffic related information such as traffic pattern information (e.g., TrafficPatternInfoListSL-r14 or TrafficPatternInfoListSL-v1530). For example, the sidelink traffic related information can include traffic characteristics of sidelink logical channel(s) that are setup for V2X sidelink communication.

In some implementations, the UE 102 transmits the UE information for sidelink to request or release sidelink resources and/or report QoS information for one or more destinations or sidelink radio bearer(s) in the sidelink communication. For example, the UE information for sidelink can include frequency information indicating at least one carrier frequency on which the UE 102 prefers to transmit V2X sidelink communication (e.g., sidelink packets). In another example, the UE information for sidelink can include frequency information of at least one carrier frequency on which the UE 103 is interested to receive V2X sidelink communication (e.g., sidelink packets). In such a case, the carrier frequency information of the UE 102 and the carrier frequency information of the UE 103 should indicate the same carrier frequency where the UE 102 can perform sidelink communication with the UE 103. In yet another example, the UE information for sidelink can include at least one destination identity. In still another example, the UE information for sidelink can include UE capabilities for sidelink. Further, the UE information for sidelink can indicate RLC mode(s) for sidelink radio bearer(s). The UE information for sidelink also can include synchronization reference(s).

If the UE information for sidelink indicates release of sidelink resources or the sidelink communication for a carrier frequency, the first or second sidelink configuration(s) may indicate to the UE 102 to release sidelink resources or the sidelink communication for the carrier frequency. If the UE information for sidelink indicates release of sidelink resources or the sidelink communication for all carrier frequencies, the first or second sidelink configuration(s) may indicate to the UE 102 to release sidelink resources or the sidelink communication for all carrier frequencies for the sidelink communication.

In some implementations, the UE 102 transmits 304A an RRC message including the UE information for sidelink to the S-DU 174A and the CU 172 may include the RRC message in in the UE Context Modification Request or UE Context Setup Request message described above. The RRC message can be an EUTRA RRC message or a NR RRC message. For example, the RRC message can be a SidelinkUEInformation message, a SidelinkUEInformationNR message, a UEAssistanceInformation message, or a MeasurementReport message conforming to 3GPP specification 36.331 or 38.331. If the base station 106A is a gNB and the RRC message is an EUTRA RRC message, the UE 102 can transmit 304A a NR RRC container message (e.g., a ULInformationTransferIRAT message) including the EUTRA RRC message to the gNB 106A via the S-DU 174A. The gNB extracts the EUTRA RRC message from the NR RRC container message.

If the base station 106A is a gNB and the RRC message is an EUTRA RRC message, the CU 172 can include the EUTRA RRC message in a first field (e.g., tag the EUTRA RRC message with the first field name) in the UE Context Modification Request or UE Context Setup Request message described above. If the base station 106A is a gNB and the RRC message is an NR RRC message, the CU 172 can include the NR RRC message in a second field (e.g., tag the NR RRC message with the second field name) in the UE Context Modification Request or UE Context Setup Request message described above. Thus, the S-DU 174A or T-DU 174B can determine the RRC message is an EUTRA RRC message or NR RRC message according to the first field or second field. In some implementations the CU 172 includes the RRC message in an RRC container IE (e.g., a HandoverPreparationInformation or CG-ConfigInfo IE) and includes the RRC container IE in the field. In other implementations the CU 172 includes the RRC message in the field without using an RRC container IE.

In some implementations, the RRC reconfiguration message and RRC reconfiguration complete are RRCReconfiguration message and RRCReconfigurationComplete message, respectively. The RRC reconfiguration message may include a field or IE (e.g., reconfigurationWithSync or ReconfigurationWithSync) indicating handover or PSCell change. In some implementations, the S-DU configuration or T-DU configuration can be a CellGroupConfigIE or include configurations in the CellGroupConfigIE.

In some implementations, the first or second sidelink configuration(s) can configuration parameters for NR or EUTRA sidelink communication, e.g., even the base station 106A is a gNB. In some implementations, the first or second sidelink configuration(s) include configuration parameters in a SL-PHY-MAC-RLC-ConfigIE (e.g., SL-PHY-MAC-RLC-Config-r16 IE) conforming to 3GPP specification 38.331. In other implementations, the first or second sidelink configuration(s) include configuration parameters in a SL-Con-figDedicatedEUTRA-Info IE (e.g., SL-ConfigDedicat-edEUTRA-Info-r16 IE) conforming to 3GPP specification 38.331. In some implementations, the first sidelink configu-ration(s) can be a first SL-PHY-MAC-RLC-Config IE (e.g., SL-PHY-MAC-RLC-Config-r16 IE) conforming to 3GPP specification 38.331, or a first SL-ConfigDedicatedEUTRA-Info IE (e.g., SL-ConfigDedicatedEUTRA-Info-r16 IE) con-forming to 3GPP specification 38.331. In other implemen-tations, the second sidelink configuration(s) can be a second SL-PHY-MAC-RLC-Config IE (e.g., SL-PHY-MAC-RLC-Config-r16 IE) conforming to 3GPP specification 38.331, or a second SL-ConfigDedicatedEUTRA-Info IE (e.g., SL-ConfigDedicatedEUTRA-Info-r16 IE) conforming to 3GPP specification 38.331.

In some implementations, the SL-ConfigDedicat-edEUTRA-Info IE may include a RRCConnectionRecon-figuration message conforming to 3GPP LTE specification 36.331. In some implementations, the SL-ConfigDedicat-edEUTRA-Info IE may include one or more SL-TimeOff-setEUTRA-r16 IEs (e.g., SL-TimeOffsetEUTRA-r16 IE) conforming to 3GPP NR specification 38.331. For example, the SL-ConfigDedicatedEUTRA-Info IE may include a sl-TimeOffsetEUTRA-List-r16 field including the one or more TimeOffsetEUTRA-r16 IEs.

In some implementations, the S-DU 174A generates the first sidelink configuration(s) for EUTRA sidelink commu-nication, if the UE information for sidelink is for EUTRA or the S-DU 174A receives an EUTRA RRC message including the UE information for sidelink in the UE Context Modifi-cation Request message. In other implementations, the S-DU 174A generates the first sidelink configuration(s) for NR sidelink communication, if the UE information for sidelink is for NR or the S-DU 174A receives an NR RRC message including the UE information for sidelink in the UE Context Modification Request message.

In some implementations, the T-DU 174B generates the second sidelink configuration(s) for EUTRA sidelink com-munication, if the UE information for sidelink is for EUTRA or the T-DU 174B receives an EUTRA RRC message including the UE information for sidelink in the UE Context Modification Request message. In other implementations, the T-DU 174B generates the second sidelink configuration(s) for NR sidelink communication, if the UE information for sidelink is for NR or the T-DU 174B receives an NR RRC message including the UE information for sidelink in the UE Context Modification Request mes-sage.

Now referring to FIG. 3B, the UE 102 in a scenario 300B initially communicates 302B with the CU 172 via the S-DU 174A, and then the UE 102 and the base station 106A perform 350B a sidelink configuration procedure, similar to events 302A and 350A discussed previously. The CU 172 then determines 312B that the UE 102 should perform a handover to the T-DU 174B. In response to this determina-tion, the CU 172 generates 312B a HandoverPreparationIn-formation IE with a Sidelink UE Information (SUI) IE. In some implementations, the CU 172 can generate the SUI IE based on the UE information for sidelink received during the sidelink configuration procedure 350B. In other implemen-tations, the UE information for sidelink includes or is the SUI IE. That is, the CU 172 receives the SUI IE from the UE 102 at the sidelink configuration procedure 350B and includes the SUI IE in the HandoverPreparationInformation IE.

The CU 172 then transmits 314B a request to set up a UE context, e.g., in the form of a UE Context Setup Request message. The request includes a HandoverPreparationInfor-mation IE with sidelink information for the UE. In particu-lar, the HandoverPreparationInformation message can include the SUI IE. The T-DU 174B receives 314B the UE Context Setup Request message and, because this message includes the HandoverPreparationInformation IE with side-link-related UE information, the T-DU 174B regards event 314B as indication of V2X sidelink information.

The T-DU 174B transmits 316B a UE Context Setup Response message to the CU 172 in response to the UE Context Setup Request message, similar to event 316A discussed previously. The CU 172 then generates 318B a handover command including the T-DU configuration and the sidelink configuration(s) and transmits 320B the han-dover command to the S-DU 174A, which in turn forwards 332B the handover command to the UE 102 via the radio interface.

The UE 102 performs 324B a random access procedure with the T-DU 174B, similar to event 324A, and transmits 326B a handover complete message to the T-DU 174B. The T-DU 174B forwards 328B the handover complete message to the CU 172. Thus, events 320B-328B are generally similar to events 320A-328A discussed previously, but involve handover messages rather than RRC reconfiguration messages. After performing the random access procedure, the UE 102 communicates 330B with the CU via the T-DU 174B according to configuration parameters in the T-DU configuration or RRC reconfiguration message.

In some implementations, the handover command and handover complete messages can be RRC reconfiguration and RRC reconfiguration complete messages, respectively as described for FIG. 3A.

In a scenario 300C of FIG. 3C, events 302C and 350C are similar to events 302A, 302B and 350A, 350B, respectively. The CU 172 determines 342 that the UE 102 should perform a handover to the T-DU 174B and generates a Handover-PreparationInformation IE. However, unlike the scenario of FIG. 3B, the CU 172 here does not include the SUI IE in the HandoverPreparationInformation IE.

Instead, the CU 172 provides the SUI IE to the target T-DU 174B after receiving the handover complete message. In particular, the CU 172, the S-DU 174A, the T-DU 174B, and the UE 102 perform a handover procedure at events 320C-328C similar to events 320B-328B (but without the SUI IE as noted above), and the UE 102 can begin to communicate 330C with the CU via the T-DU 174B accord-ing to configuration parameters in the T-DU configuration or RRC reconfiguration message. The CU 172 then transmits 332C a UE Context Modification Request message includ-ing a CG-ConfigInfo IE, which in turn includes the SUI IE. The T-DU 174B transmits 334C a UE Context Modification Response message including the sidelink configuration(s) to the CU 172, in response to the UE Context Modification Request message.

Now referring to FIG. 3D, events 302C and 350C are similar to events 302A-C and 350A-C, respectively. The CU 172 determines 362 that the UE 102 should perform a handover to the T-DU 174B and generates a HandoverPrepa-rationInformation IE, generates a CG-ConfigInfo IE that includes the SUI IE, and includes the CG-ConfigInfo IE with the SUI IE in the HandoverPreparationInformation IE. The CU 172 then transmits 364 a UE Context Setup Request message including the generated HandoverPreparationInfor-mation IE to the T-DU 174B. Subsequent events 316D-330D are similar to events 316B-330B, respectively, discussed previously with reference to FIG. 3B.

In FIG. 4A, a scenario 400A begins with the UE 102 communicating 402 with an S-BS 104. The UE 102 transmits 404 a SUI IE to the S-BS 104 using a suitable RRC message, for example. The S-BS 104 then determines 412 that the UE 104 should perform a handover to the T-DU 174 of the base station 106A. The S-BS 104 generates 412 a HandoverPreparationInformation IE that includes the SUI IE and transmits 405 a Handover Request message with the HandoverPreparationInformation IE (which in turn includes the SUI IE) to the target CU (T-CU) 172.

Similar to event 314A, the T-CU 172 transmits 414A to the T-DU 174 a UE Context Setup Request message that includes a HandoverPreparationInformation IE with sidelink information for the UE. The T-DU 174B receives 414A the UE Context Setup Request message and, because this message includes the HandoverPreparationInformation IE with sidelink-related UE information, the T-DU 174B regards event 414A as indication of V2X sidelink information.

The T-DU 174B transmits 416A a UE Context Setup Response message to the CU 172 in response to the UE Context Setup Request message, similar to event 316B discussed previously. The CU 172 then generates 418A a handover command including the T-DU configuration and the sidelink configuration(s) and transmits 421 to the S-BS 104 a Handover Request Acknowledgement message responsive to the handover request 405. The Handover Request Acknowledgement message includes a handover command, which the S-BS 104 forwards 422 to the UE 102 using an appropriate RRC message.

The UE 102 performs 424A a random access procedure with the T-DU 174, similar to event 324, and transmits 426A a handover complete message to the T-DU 174B. The T-DU 174B forwards 428A the handover complete message to the CU 172, and the UE 102 communicates 430A with the CU via the T-DU 174B according to configuration parameters in the T-DU configuration or RRC reconfiguration message.

Referring to FIG. 4B, a scenario 400B is generally similar to the scenario 300C of FIG. 3C, but here the UE 102 performs a handover to another base station rather than another DU within the same base station. After events 402-405 discussed previously, the T-CU 172 does not include the SUI IE in the HandoverPreparationInformation IE and transmits 444 a UE Context Setup Request message with the HandoverPreparationInformation IE and without the SUI IE to the T-DU 174. The T-DU 174B then transmits 416B to the T-CU 172 a UE Context Setup Response message, which is similar to the message of event 416A but excludes sidelink configurations(s). After events 421-430 discussed previously with reference to FIG. 4A, the CU 172 then transmits 432 a UE Context Modification Request message including a CG-ConfigInfo IE, which in turn includes the SUI IE. The T-DU 174B transmits 434 a UE Context Modification Response message including the sidelink configuration(s) to the CU 172, in response to the UE Context Modification Request message.

Now referring to a scenario 400C of FIG. 4C, after events 402-405 discussed previously, the CU 172 generates 464 a HandoverPreparationInformation IE, generates a CG-ConfigInfo IE that includes the SUI IE, and includes the CG-ConfigInfo IE with the SUI IE in the HandoverPreparation-Information IE and sends it 465 in a UE Context Setup Request message. Event 416C is similar to event 416B of FIG. 4B, and subsequent events are similar to those of FIG. 4A, with like reference numbers referring to similar events.

Figure 5:
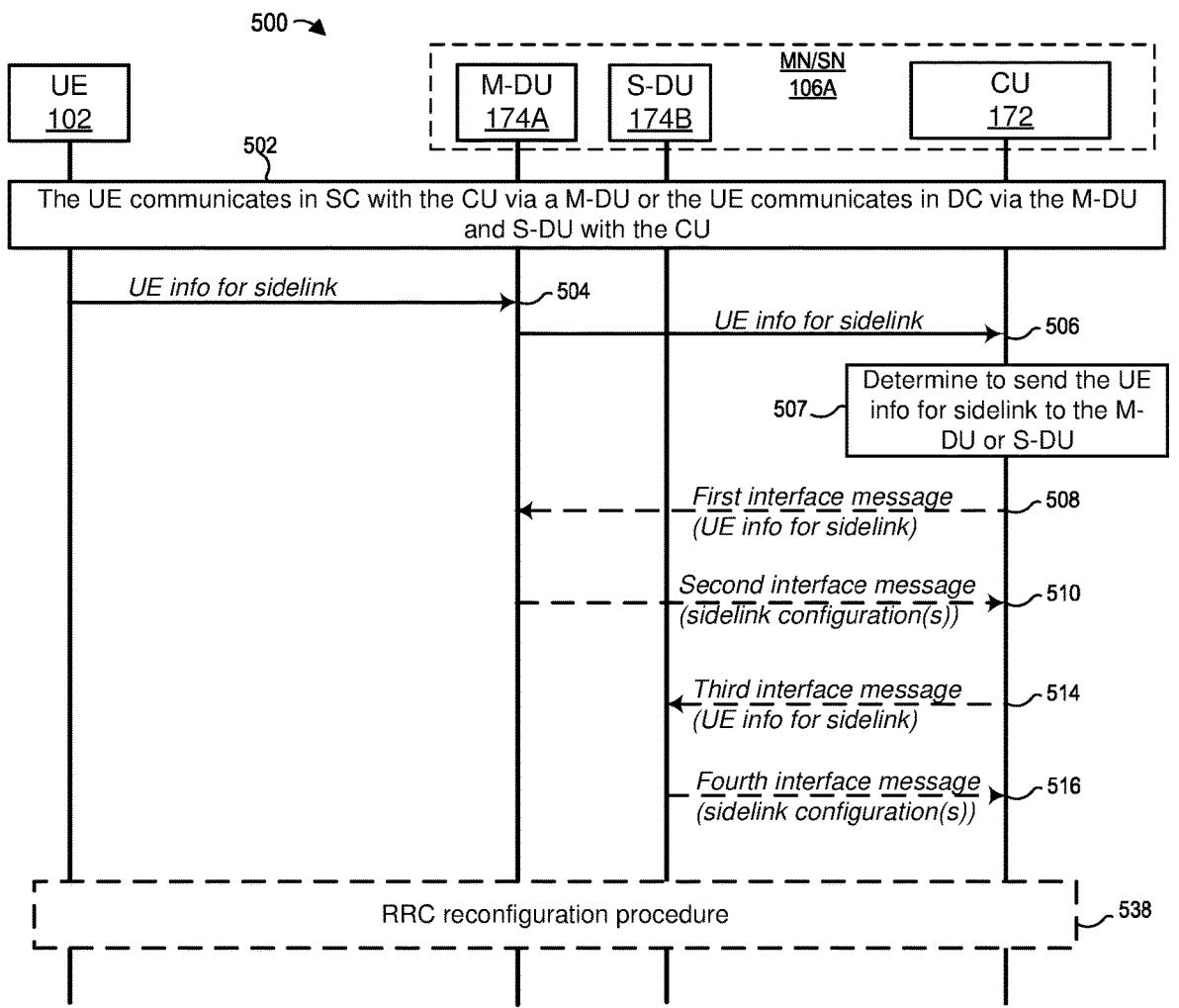
FIG. 5 is a messaging diagram of an example scenario in which a CU receives UE information for sidelink communication for a UE and selects one of multiple DUs for configuring the UE with sidelink resources.

Next, FIG. 5 illustrates a set of scenarios 500 in which the CU 172 initially communicates 502 with the UE 102 in single connectivity or dual connectivity. The base station

106A operates as both an MN and an SN, with the MN including a CU (e.g., the CU 172) and a first DU (e.g., a DU 174A of the one or more DUs 174, referred to herein as a master DU (M-DU) 174A) of the base station 106A, and the SN including the same CU and a second, different DU (e.g., a DU 174B of the one or more DUs 174, referred to herein as a secondary DU (S-DU) 174B) of the base station 106A. Events in the scenario 500 similar to those discussed previously with respect to the scenario 300A are labeled with similar reference numbers (e.g., with event 302A corresponding to event 502, event 304 corresponding to event 504).

Initially, the UE 102 communicates 502 in SC with the CU 172 via the M-DU 174A. Alternatively, the UE 102 communicates 502 in DC with the CU 172 via the M-DU 174A and the S-DU 174B. The UE 102 in SC or DC then transmits 504 UE information for sidelink to the M-DU 174A, which in turn transmits 506 the UE information for sidelink communication to the CU 172.

The CU 172 determines 507 that it should transmit the UE information for sidelink to the M-DU 174A or the S-DU 174B. If the CU 172 determines it should send the UE information for sidelink to the M-DU 174A, the CU 172 transmits 508 a first interface message including the UE information for sidelink to the M-DU 174A. In response, the M-DU 174A can transmit 510 a second interface message including first sidelink configuration(s) to the CU 172. In some implementations, the first interface message can be a UE Context Modification Request message similar to the UE Context Modification Request message 308A. The second interface message can be a UE Context Modification Response message similar to the UE Context Modification Response message 310A or the UE Context Modification Required message described for FIG. 3A.

If the CU 172 instead determines to send the UE information for sidelink to the S-DU 174B, the CU 172 transmits 514 a third interface message including the UE information for sidelink to the S-DU 174B. In response, the S-DU 174B can send 516 a fourth interface message including second sidelink configuration(s) to the CU 172. In some implementations, the third interface message can be a UE Context Modification Request message similar to the UE Context Modification Request message 308A or 314A. The fourth interface message can be a UE Context Modification Response message similar to the UE Context Modification Response message 310A or 316A, or the UE Context Modification Required message described for FIG. 3A.

The CU 172 can perform 538 an RRC reconfiguration to send the first or second sidelink configuration(s) to the UE 102 via the M-DU 174A. Alternatively, the CU 172 can perform 538 an RRC reconfiguration to send the first or second sidelink configuration(s) to the UE 102 via the S-DU 174B. As described for FIG. 3A, the CU 172 can include a DU configuration (e.g., a M-DU configuration or a S-DU configuration) in an RRC reconfiguration message in the RRC reconfiguration procedure, in addition to the (first or second) sidelink configuration(s). Implementations of the DU configuration can refer to the description of generating the T-DU configuration for FIG. 3A.

In some implementations, the CU 172 can determine that it should send the UE information for sidelink to the M-DU 174A if the CU 172 determines that the UE 102 can only perform sidelink communication on a carrier frequency operated by the M-DU 174A. Similarly, the CU 172 can determine it should transmit the UE information for sidelink to the M-DU 174A if the CU 172 is configured to determine that the UE 102 can only perform sidelink communication on a carrier frequency operated by the S-DU 174A. In other implementations, the CU 172 can indicate a carrier frequency on which the UE 102 prefers to perform V2X sidelink communication according to frequency information in the UE information for sidelink as described for FIG. 3A.

If the CU 172 determines that the carrier frequency is associated with a cell of the M-DU 174A, the CU 172 transmits 508 the UE information for sidelink to the M-DU 174A. If the CU 172 determines that the carrier frequency is operated by the S-DU 174B, the CU 172 transmits 514 the UE information for sidelink to the S-DU 174B. In yet other implementations, the CU 172 determines that it should send the UE information for sidelink to the M-DU 174A or S-DU 174B based on the M-DU 174A or S-DU 174B from which the CU 172 receives the UE information for sidelink. If the CU 172 receives the UE information for sidelink from the M-DU 174A, the CU 172 transmits 508 the UE information for sidelink to the M-DU 174A. On the other hand, if the CU 172 receives the UE information for sidelink from the S-DU 174B, the CU 172 transmits 514 the UE information for sidelink to the S-DU 174B.

Figure 6:
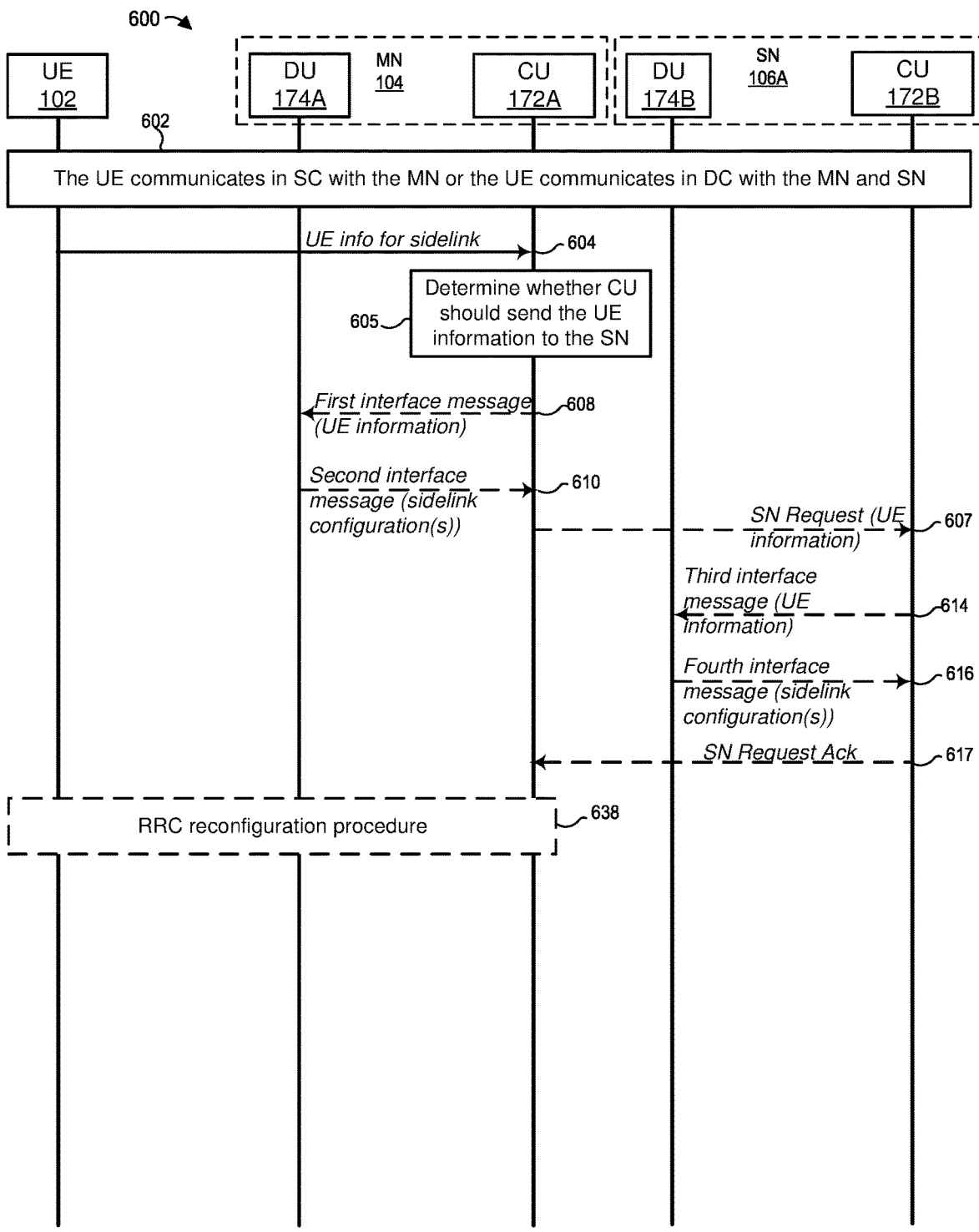
FIG. 6 is a messaging diagram of an example scenario in which a CU receives UE information for sidelink communication for a UE and selects a DU of the same distributed base station or another base station for configuring the UE with sidelink resources and operating as a secondary node (SN)

Referring to FIG. 6, a scenario 600 involves a distributed MN 104 with a CU 172A and a DU 174A, as well as a distributed SN 106A with a CU 172B and a DU 174B. The UE 102 initially communicates 602 with SC with the MN 104 or in DC with the MN 104 and the SN 106A. The UE 102 in SC or DC then transmits 604 communication UE information for sidelink communication.

In response, the CU 172 determines 605 whether it should transmit the received UE information for sidelink to the SN 106A. To this end, the CU 172 can consider factors similar to those discussed previously with reference to event 507 of FIG. 5. When the CU 172 determines that the DU 174A can support the sidelink configuration, the SN 106A transmits 608 a first interface message with the UE information to the DU 174A and receives 610 a second interface message with the sidelink configuration in response. Otherwise, the CU 172 transmits an SN request with the UE information to the CU 172B. The SN request can be for example a request to an SN node or a request to modify the SN node. The CU 172B transmits 614 a third interface message with the UE information to the DU 174B and receives 616 a fourth interface message with the sidelink configuration(s) in response. The CU 172B then transmits 617 an SN request acknowledgement, responsive to event 607, to the CU 172A. The UE 102 and the CU 172A then perform an RRC reconfiguration procedure.

Several example methods that a DU and a CU of this disclosure can implement are considered next. Each of these methods can be implemented using suitable processing hardware such as for example one or more processors configured to execute instructions stored on a non-transitory computer-readable medium.

Referring first to FIG. 7, an example method 700 for generating sidelink configuration based on a UE information received from a CU can be implemented in the DU 174A, 174B, or another suitable DU. At block 702, the DU receives UE information for sidelink for a UE. The DU can receive this information from a CU such as the CU 172A or 172B for example. At block 704, the DU generates sidelink configuration(s) for the UE according to the received UE information. The DU then sends the sidelink configuration(s) to the CU.

FIG. 8 is a flow diagram of an example method 800 in a CU, such as the CU 172A or 172B, for selecting a DU for configuring sidelink resources to a UE, with the selection based on whether UE sidelink information arrives from a UE or another base station. The method 800 begins at block 802, where the CU receives UE information for sidelink communication for a UE. If the CU determines at block 804 that the UE information for sidelink communication arrived via an SRB, and thus at the same base station in which the CU operates, the flow proceeds to block 806. Otherwise, the block proceeds to block 810. The CU in this case can determine that the UE information for sidelink communication arrived in a container IE, and thus in an interface message from another base station.

At block 806, the CU generates a first interface that includes a CG-ConfigInfo IE with the UE information for sidelink communication. More specifically, the UE information for sidelink communication can be a SUI IE for example. Next, at block 808, the CU sends the first interface message to a first DU. Otherwise, at block 810, the CU does not generate a CG-ConfigInfo IE with UE information for sidelink communication. At block 812, the CU generates a second interface message with a container IE. The CU then sends the second interface message to a second DU. The first DU can operate for example within the same base station as the CU, and the second DU can operate in a different base station.

Referring to FIG. 9, a CU can implement a method 900 to select a DU for configuring sidelink resources to a UE, with the selection based on whether the UE is performing a handover. The method 900 begins at block 902, where the CU receives UE information for sidelink communication for a UE.

At block 904, the CU determines whether it should initiate a handover for the UE. When no handover is necessary, the flow proceeds to block 906, where the CU generates a first interface that includes a CG-ConfigInfo IE with the UE information for sidelink communication, similar to block 806. The CU then sends the first interface message to a first DU, at block 908.

When the CU determines that the UE should perform a handover, the flow proceeds to block 910, where the CU generates a second interface message with a Handover-PreparationInformation IE that includes the UE information for sidelink communication (e.g., a SUI IE). At block 912, the CU sends the second interface message to a second DU. The first and second DUs can operate in the same distributed base station or different distributed base stations.

FIG. 10 is a flow diagram of an example method 1000 in a CU for configuring a DU to perform a handover of a UE concurrently with sidelink configuration of the UE. At block 1002, the CU receives UE information for sidelink communication for a UE. Next, at block 1004, the CU determines the UE should perform a handover to a target cell. At block 1006, the CU generates a first interface message with a HandoverPreparationInformation IE to support the handover procedure, and a CG-ConfigInfo IE that includes the UE information for sidelink communication. At block 1008, the CU sends the first interface message to a DU. At block 1010, the CU receives a second interface message in response. The second interface message includes a CellGroupConfig IE from the DU, to support the handover operation.

Now referring to FIG. 11, an example method 1100 in a DU for processing handover preparation information and a cell group configuration (including sidelink information for a UE) begins at block 1102. The DU receives a first interface message including a HandoverPreparationInformation IE and a CG-ConfigInfo IE for a UE, from a CU. At block 1104, the DU generates a CellGroupConfig IE for a handover operation, responsive to the HandoverPreparationInformation IE. At block 1106, the DU sends a second interface message including the CellGroupConfig IE to the CU.

Figure 12:
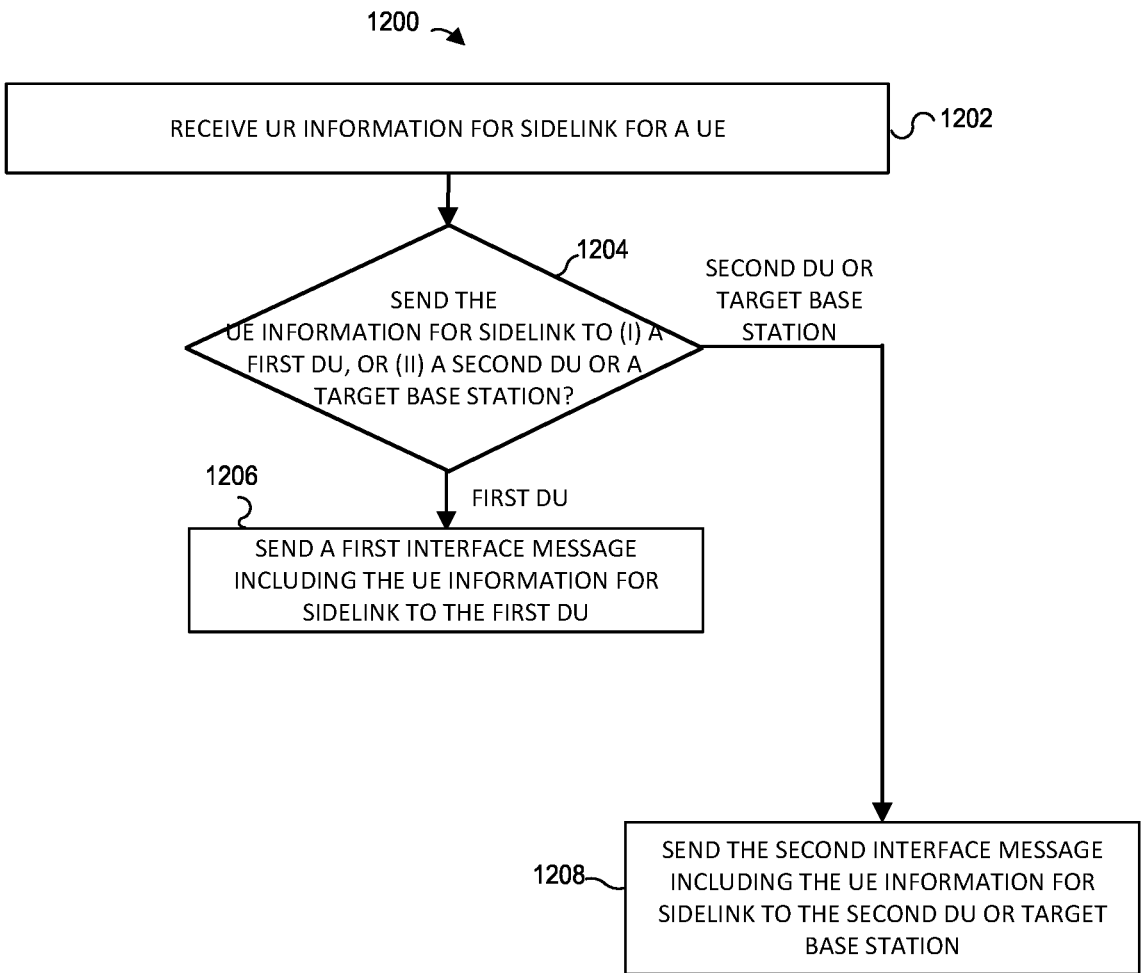
FIG. 12 is a flow diagram of an example method according to which a CU receives UE information for sidelink communication for a UE and applies, to an interface message, a first format to provide the UE information to a first DU, or another format to provide the UE information to a second DU or another base station.

FIG. 12 illustrates an example method 1200 for generating an interface message, which can be implemented in a CU. At block 1202, the CU receives UE information for sidelink communication for a UE. At block 1204, the CU determines whether it should send the UE information for sidelink communication to a first DU or, alternatively, to a second DU or another base station. If the CU determines it should the UE information for sidelink communication to the first DU, the CU sends a first interface message including the UE information for sidelink communication to the first DU. Otherwise, at block 1208, the CU sends a second interface message including the UE information for sidelink communication to the second DU or another base station. Thus, according to the method 1200, the CU selects a format for formatting an interface message depending on the target network node.

Figure 13:
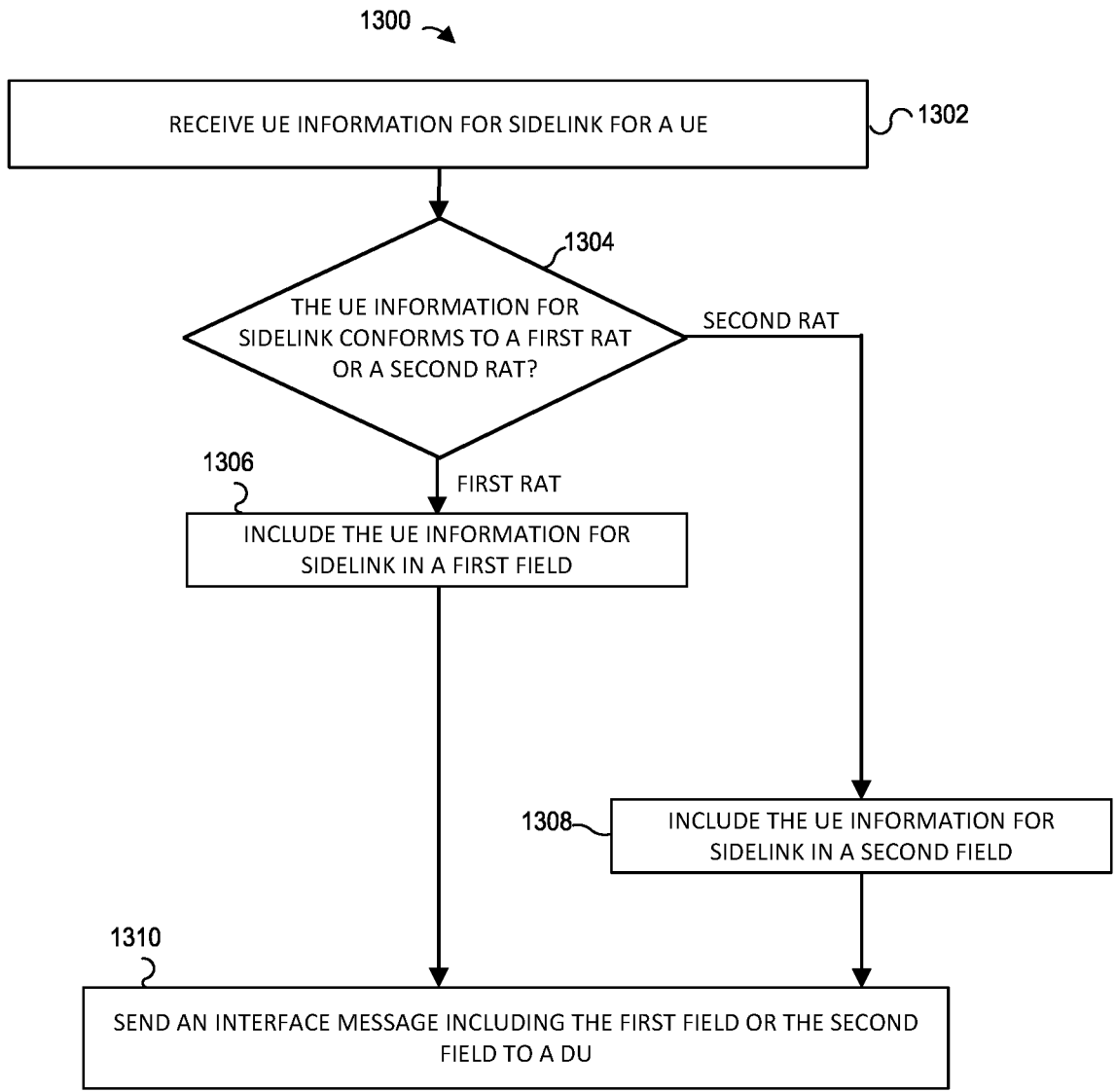
FIG. 13 is a flow diagram of an example method according to which a CU receives UE information for sidelink communication for a UE and formats an interface message in accordance with a RAT over which the UE information arrived from the UE.

Referring to FIG. 13, a CU can implement an example method 1300 for selecting a field in which the CU transmits the UE information for sidelink communication. At block 1302, the CU receives UE information for sidelink communication for a UE. At block 1304, the CU determines whether the UE information for sidelink communication conforms to a first RAT or a second RAT. When the UE information conforms to the first RAT, the CU includes the UE information for sidelink communication in a first field (block 1306). Otherwise, when the UE information for sidelink communication conforms to the second RAT, the flow proceeds to block 1308, where the CU includes the UE information for sidelink communication in a second field. At block 1310, the CU then sends an interface message that includes the first field or the second field to the DU.

Next, FIG. 14 illustrates a flow diagram of an example method 1400 in a DU for generating sidelink configuration in view of a RAT to which UE information for sidelink communications conforms. At block 1402, the DU receives, from a CU, UE information for sidelink communication for a UE. At block 1404, the DU determines whether the UE information for sidelink communication conforms to a first RAT or a second RAT. When the UE information conforms to the first RAT, the DU at block 1406 generates a sidelink configuration that conforms to the first RAT as well a sidelink configuration that conforms to the second RAT. The DU then sends an interface message including both sidelink configurations to the CU, at block 1410. Otherwise, when the UE information conforms to the second RAT, the DU at block 1406 generates only a sidelink configuration that conforms to the second RAT. The flow then similarly proceeds to block 1410.

FIG. 15 is illustrates an example method 1500 in a CU for generating an RRC message with sidelink configuration in two different formats conforming to two respective RATs. At block 1502, the CU receives a first sidelink configuration that conforms to the first RAT, from a DU. At block 1504, the CU generates a second sidelink configuration that conforms to the second RAT. At block 1506, the CU sends an RRC message includes the first sidelink configuration and the second sidelink configuration to the UE.

Finally, FIG. 16 illustrates an example method 1600 in a CU for managing sidelink communications.

At block 1602, the CU receives sidelink information related to sidelink communications at a UE operating in a first cell (e.g., event 306A of FIG. 3A, 350B of FIG. 3B, 350C of FIG. 3C, 350D of FIG. 3D, 405 of FIGS. 4A-C, 506 of FIG. 5; 604 of FIG. 6).

At block 1604, the CU determines that the UE should utilize a radio resource on a second cell associated with a target node, the target node corresponding to a DU of the distributed base station or another base station (e.g., events 312A of FIG. 3A, 312B of FIG. 3B, 342 of FIG. 3C, 362 of FIG. 3D, 414 of FIG. 4A, 418 of FIGS. 4B and 4C, 507 of FIG. 5, 605 of FIG. 6).

At block 1606, the CU transmits the sidelink information to the target node (e.g., event 314A of FIG. 3A, 314B of FIG. 3B, 332 of FIG. 3C, 364 of FIG. 3D, 414 of FIG. 4A, 432 of FIG. 4B, 464 of FIG. 4C, 508 or 514 of FIG. 5, 608 or 607 of FIG. 6).

At block 1608, the CU receives, from the target node, a sidelink configuration for the UE (e.g., event 316A of FIG. 3A, 316B of FIG. 3B, 334 of FIG. 3C, 316 of FIG. 3D, 416 of FIG. 4A, 434 of FIG. 4B, 416 of FIG. 4C, 510 or 516 of FIG. 5, 610 or 616 of FIG. 6).

The following description may be applied to the description above.

In some implementations, "message" is used and can be replaced by "information element (IE)". In some implementations, "IE" is used and can be replaced by "field".

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

The following list of examples reflects a variety of the embodiments explicitly contemplated by the present disclosure.

Example 1. A method of obtaining sidelink configuration in a central unit (CU) of a distributed base station comprises receiving, by one or more processors, sidelink information related to sidelink communications at a UE operating in a first cell; determining, by the one or more processors, that the UE should utilize a radio resource on a second cell associated with a target node, the target node corresponding to a distributed unit (DU) of the distributed base station or another base station; transmitting, by the one or more processors, the sidelink information to the target node; and receiving, by the one or more processors and from the target node, a sidelink configuration for the UE.

Example 2. The method of example 1, wherein determining that the UE should utilize the radio resource on the second cell includes initiating a handover procedure or a cell change procedure.

Example 3. The method of example 2, wherein transmitting the sidelink information to the target node includes transmitting a request to set up a context for the UE, the request including the sidelink information; and receiving the sidelink configuration includes receiving, from the target node, a response to the request, the response including (i) a target DU (T-DU) configuration and (ii) the sidelink configuration.

Example 4. The method of example 3, further comprising: generating, by the one or more processors, a radio resource control (RRC) reconfiguration command for the UE, the RRC reconfiguration command including the T-DU configuration and the sidelink configuration; and transmitting, by the one or more processors, the command to the UE via a source DU.

Example 5. The method of example 3, wherein the request includes a handover preparation information message, the message including a Sidelink UE Information (SUI) information element (IE) to convey the sidelink information.

Example 6. The method of example 5, wherein the SUI IE is included in a CG-ConfigInfo IE.

Example 7. The method of any of example 5 or 6, further comprising: generating, by the one or more processors, a handover command including the T-DU configuration and the sidelink configuration; and transmitting, by the one or more processors, the handover command to the UE via a source DU.

Example 8. The method of example 2, further comprising: transmitting, to the target node, a request to set up a context for the UE, the requesting including a handover preparation information message; and in response to receiving an indication that the UE has completed a handover from the first cell to the second cell: transmitting, to the target node, a request to modify a context for the UE, the request including a SUI IE to convey the sidelink information.

Example 9. The method of any of examples 2-4 or 6-8, wherein: receiving the sidelink information includes receiving the sidelink information from a first DU of the distributed base station; and transmitting the sidelink information to the target node includes transmitting the sidelink information to a second DU of the distributed base station.

Example 10. The method of any of examples 2, 3, or 5-8, wherein: receiving the sidelink information includes receiving a handover request with the handover preparation information from a base station other than the distributed base station.

Example 11. The method any of the preceding examples, wherein the sidelink information includes an indication of at least one frequency on which the UE prefers to transmit and/or receive sidelink data.

Example 12. The method of example 1, wherein: receiving the sidelink information includes receiving the sidelink information from the UE via a source DU of the distributed base station; and determining that the UE should utilize the radio resource on the second cell includes: determining, based on the sidelink information, that a frequency on which the UE prefers to transmit and/or receive sidelink data is associated with the second cell.

Example 13. The method of example 12, wherein the target node is another DU of the distributed base station.

Example 14. The method of example 12, wherein the target node is associated with another base station.

Example 15. The method of example 12, wherein transmitting the sidelink information includes transmitting a request to add or modify a secondary node (SN), so that the UE operates in DC with the distributed base station operating as master node (MN) and the SN.

Example 16. The method of example 1, wherein the receiving the sidelink information includes: determining whether the sidelink information was received at the distributed base station via a signaling radio bearer (SRB); and further comprising: in response to determining that the sidelink information was received at the distributed base station via an SRB: generating a first interface message with a CG-ConfigInfo IE including the sidelink information, and selecting a first DU as the target node; in response to determining that the sidelink information was not received at the distributed base station via an SRB: generating a second interface message with a container IE including the sidelink information, and selecting a second DU as the target node.

Example 17. The method of any of the preceding examples, further comprising: formatting an interface message for transmission to the target node in accordance with whether the sidelink information conforms to a first radio access technology (RAT) or a second RAT.

Example 18. The method of example 1, wherein: the sidelink configuration is a first sidelink configuration conforming to a first RAT; the method further comprising: generating, by the one or more processors, a second sidelink configuration that conforms to a second RAT; and generating, by the one or more processors, an RRC message including the first sidelink configuration and the second sidelink configuration, for transmission to the UE.

Example 19. A method of generating sidelink configuration in a distributed unit (DU) of a distributed base station comprises: receiving, by one or more processors and from a CU of the distributed base station, sidelink information related to sidelink communications at a UE operating in a first cell; generating, by the one or more processors, the sidelink configuration for the UE based on the sidelink information; and transmitting, by the one or more processors, the sidelink configuration to the CU.

Example 20. The method of example 20, wherein generating the sidelink configuration includes: in response to determining that the sidelink information conforms to a first RAT: generating (i) a first instance of the sidelink configuration, conforming to the first RAT, and (ii) a second instance of the sidelink configuration, conforming to a second RAT, for transmission to the CU; and in response to determining that the sidelink information conforms to a second RAT: generating only one instance of the sidelink configuration, conforming to the second RAT, for transmission to the CU.

Example 21. The method of example 20, wherein: receiving the sidelink information includes receiving a first interface message including handover preparation information and a CG-ConfigInfo IE with the sidelink information; and generating the sidelink configuration includes generating a cell group information IE for a handover operation.

Example 22. A base station comprising processing hardware and configured to implement a method according to any of the preceding examples.

What is claimed is:

1. A method of obtaining sidelink configuration in a central unit (CU) of a distributed base station, the method comprising:

receiving sidelink information related to sidelink communications at a user equipment (UE) operating in a first cell;

initiating a handover procedure or a cell change procedure so that the UE utilizes a radio resource on a second cell associated with a target node, the target node corresponding to a distributed unit (DU) of the distributed base station or another base station;

transmitting to the target node, a request to set up a context for the UE, the request including the sidelink information; and receiving, from the target node, a response to the request, the response including a sidelink configuration for the UE.

2. The method of claim 1, wherein:

the response to the request further includes a target DU (T-DU) configuration.

3. The method of claim 2, further comprising:

generating a radio resource control (RRC) reconfiguration command for the UE, the RRC reconfiguration command including the T-DU configuration and the sidelink configuration; and transmitting the command to the UE via a source DU.

4. The method of claim 1, wherein:

the request includes a handover preparation information message, the message including a Sidelink UE Information (SUI) information element (IE) to convey the sidelink information.

5. The method of claim 1, wherein the request includes a handover preparation information message; and in response to receiving an indication that the UE has completed a handover from the first cell to the second cell:

transmitting, to the target node, a request to modify a context for the UE, the request including a SUI IE to convey the sidelink information.

6. The method of claim 1, wherein:

receiving the sidelink information includes receiving a handover request with the handover preparation information from a base station other than the distributed base station.

7. The method of claim 1, further comprising:

formatting an interface message for transmission to the target node in accordance with whether the sidelink information conforms to a first radio access technology (RAT) or a second RAT.

8. The method of claim 1, wherein the sidelink configuration includes an SL-ConfigDedicatedEUTRA-Info IE.

9. The method of claim 1, wherein the sidelink configuration includes an SL-ConfigDedicatedEUTRA-Info-r16 IE.

10. A method of generating sidelink configuration in a distributed unit (DU) of a distributed base station, the method comprising:

receiving from a central unit (CU) of the distributed base station, a request to set up a context for a UE, the request including sidelink information related to sidelink communications at a UE operating in a first cell;

generating the sidelink configuration for the UE based on the sidelink information; and transmitting a response to the request including the sidelink configuration to the CU.

11. The method of claim 10, wherein the sidelink information is included in a handover preparation information message.

12. The method of claim 11, further comprising:

regarding the request as an indication of V2X sidelink information.

13. The method of claim 10, wherein:

receiving the sidelink information includes receiving a first interface message including handover preparation information and a CG-ConfigInfo IE with the sidelink information; and generating the sidelink configuration includes generating a cell group information IE for a handover operation.

14. A radio access network (RAN) node comprising: processing hardware, the RAN node configured to:

receive sidelink information related to sidelink communications at a UE operating in a first cell;

initiate a handover procedure or a cell change procedure so that the UE utilizes a radio resource on a second cell associated with a target node, the target node corresponding to a distributed unit (DU) of the distributed base station or another base station;

transmit, to the target node, a request to set up a context for the UE, the request including the sidelink information; and receive, from the target node, a response to the request, the response including a sidelink configuration for the UE.

* * * * *